United States Patent
Lin

(10) Patent No.: US 12,389,462 B2
(45) Date of Patent: Aug. 12, 2025

(54) SMALL DATA TRANSMISSION METHOD, USER EQUIPMENT, AND BASE STATION

(71) Applicant: Purplevine Innovation Company Limited, Hong Kong (CN)

(72) Inventor: Yi-Ting Lin, Hong Kong (CN)

(73) Assignee: Purplevine Innovation Company Limited, Hong Kong (CN)

( * ) Notice: Subject to any disclaimer, the term of this patent is extended or adjusted under 35 U.S.C. 154(b) by 456 days.

(21) Appl. No.: 17/908,244

(22) PCT Filed: Oct. 8, 2021

(86) PCT No.: PCT/CN2021/122696
§ 371 (c)(1),
(2) Date: Aug. 31, 2022

(87) PCT Pub. No.: WO2022/073482
PCT Pub. Date: Apr. 14, 2022

(65) Prior Publication Data
US 2023/0088082 A1 Mar. 23, 2023

Related U.S. Application Data

(60) Provisional application No. 63/089,007, filed on Oct. 8, 2020.

(51) Int. Cl.
*H04W 74/00* (2009.01)
*H04W 72/14* (2009.01)
(Continued)

(52) U.S. Cl.
CPC ....... *H04W 74/0841* (2013.01); *H04W 72/23* (2023.01); *H04W 76/19* (2018.02); *H04W 76/30* (2018.02)

(58) Field of Classification Search
CPC . Y02W 30/80; H04W 74/0841; H04W 76/19; H04W 76/30; H04W 72/23; H04W 74/0833; H04W 74/0836
See application file for complete search history.

(56) References Cited

U.S. PATENT DOCUMENTS

| 9,648,641 B2 | 5/2017 | Sun et al. |
| 2017/0099660 A1 | 4/2017 | Oh |

(Continued)

FOREIGN PATENT DOCUMENTS

| CN | 104981022 | 10/2015 |
| CN | 110999404 | 4/2020 |

(Continued)

OTHER PUBLICATIONS

International Search Report and the Written Opinion Dated Jan. 6, 2022 From the International Searching Authority Re. Application No. PCT/CN2021/122696. (7 Pages).

(Continued)

*Primary Examiner* — Awet Haile

(57) ABSTRACT

A user equipment (UE) executes a small data transmission method. The UE obtains small data transmission (SDT) physical random access channel (PRACH) resource configuration for small data transmission. The SDT PRACH resource configuration comprises at least one of a first random access preamble or a first set of radio resources for transmission of the first random access preamble and is differentiated from non-SDT PRACH resource configuration. The UE initiates a random access procedure by transmitting the first random access preamble on the first set of radio resources for the SDT. The small data transmission includes transmission of a first data payload in a PRACH uplink message of the random access procedure.

40 Claims, 13 Drawing Sheets

(51) Int. Cl.
*H04W 72/23* (2023.01)
*H04W 74/0833* (2024.01)
*H04W 76/10* (2018.01)
*H04W 76/19* (2018.01)
*H04W 76/30* (2018.01)

(56) References Cited

U.S. PATENT DOCUMENTS

| | | | |
|---|---|---|---|
| 2021/0337602 A1* | 10/2021 | Liu | H04W 74/002 |
| 2022/0264518 A1* | 8/2022 | Da Silva | H04W 76/27 |
| 2022/0264655 A1 | 8/2022 | Fujishiro et al. | |
| 2023/0262815 A1* | 8/2023 | Agiwal | H04W 74/0841 |
| 2023/0300831 A1* | 9/2023 | Koskinen | H04W 76/19 |
| | | | 370/329 |
| 2023/0413366 A1* | 12/2023 | Tao | H04W 74/0833 |
| 2024/0224209 A1* | 7/2024 | Lee | H04W 76/30 |

FOREIGN PATENT DOCUMENTS

| | | |
|---|---|---|
| WO | WO 2014/181178 | 11/2014 |
| WO | WO 2020/088097 | 5/2020 |

OTHER PUBLICATIONS

"Design of RACH-Based Small Data Transmission Schemes and Common Aspects", Nokia, Nokia Shanghai Bell, 3GPP TSG-RAN WG2 Meeting #111 Electronic, Elbonia, Aug. 17-28, 2020, R2-2007564, Section 1-4, Agenda Item: 8.6.2, 4 P., Aug. 28, 2020.

* cited by examiner

SMALL DATA TRANSMISSION METHOD, USER EQUIPMENT, AND BASE STATION

RELATED APPLICATIONS

This application is a National Phase of PCT Patent Application No. PCT/CN2021/122696 having International filing date of Oct. 8, 2021, which claims the benefit of priority under 35 USC § 119 (e) of U.S. Provisional Patent Application No. 63/089,007 filed on Oct. 8, 2020. The contents of the above applications are all incorporated by reference as if fully set forth herein in their entirety.

FIELD AND BACKGROUND OF THE INVENTION

The present disclosure relates to the field of communication systems, and more particularly, to small data transmission method, a user equipment, and a base station.

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) that provide wireless links to the UEs located in cells covered by the base station, and an interface to a core network (CN) which provides overall network control. As will be appreciated the RAN and CN each conduct respective functions in relation to the overall network. The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

In 3GPP standard Rel-15 and Rel-16, NB-IoT/eMTC, LTE-based early data transmission (EDT) and pre-configured uplink (UL) resource (PUR) was specified for small data transmission during a radio resource control (RRC) idle state. For EDT, only one protocol data unit (PDU) can be transmitted during RRC Idle. When the data size for EDT is larger than N (e.g., 1000) bits, a UE does not perform EDT, and enters an RRC connected state to perform data transmission. The limitation of one PDU can restrict the flexibility of internet of things (IoT) applications. In NR, as the data size may be not so "small" (e.g. larger than 1000 bits), how to transmit the subsequent data in RRC idle should be considered. A procedure for the small data transmission (SDT) is desired.

SUMMARY OF THE INVENTION

An object of the present disclosure is to propose procedures for small data transmission (SDT) during random access procedure.

In a first aspect, an embodiment of the invention provides a small data transmission method executable in a user equipment (UE), comprising:
obtaining small data transmission (SDT) physical random access channel (PRACH) resource configuration for small data transmission, wherein the SDT PRACH resource configuration comprises at least one of a first random access preamble or a first set of radio resources for transmission of the first random access preamble and is differentiated from non-SDT PRACH resource configuration;
initiating a random access procedure by transmitting the first random access preamble on the first set of radio resources for the small data transmission (SDT), wherein the small data transmission includes transmission of a first data payload in a PRACH uplink message of the random access procedure; and receiving a contention resolution message of the random access procedure, wherein the contention resolution message comprises a signaling regarding the small data transmission.

In a second aspect, an embodiment of the invention provides a user equipment (UE) comprising a processor configured to call and run a computer program stored in a memory, to cause a device in which the chip is installed to execute the disclosed method and any combination of embodiments of the disclosed method.

In a third aspect, an embodiment of the invention provides a small data transmission method executable in a base station, comprising:
receiving a first random access preamble on a first set of radio resources for small data transmission (SDT) in a random access procedure, wherein the small data transmission includes transmission of a first data payload in a PRACH uplink message of the random access procedure, and an SDT physical random access channel (PRACH) resource configuration comprises at least one of the first random access preamble or the first set of radio resources for transmission of the first random access preamble and is differentiated from non-SDT PRACH resource configuration; and
transmitting a contention resolution message in the random access procedure in response to the first random access preamble, wherein the contention resolution message comprises a signaling regarding the small data transmission.

In a fourth aspect, an embodiment of the invention provides a base station comprising a processor configured to call and run a computer program stored in a memory, to cause a device in which the chip is installed to execute the disclosed method and any combination of embodiments of the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as a computer program product, that causes a computer to execute the disclosed method.

The disclosed method may be programmed as a computer program, that causes a computer to execute the disclosed method.

Embodiments of the disclosure provide:

4-step and 2-step RACH for SDT with only one PDU.

4-step and 2-step RACH for SDT with multiple PDUs.

RACH stands for random access channel. A UE may transmit a PUR request in Msg3 for 4-step RACH and in MsgA for 2-step RACH, and receives PUR configuration replied in Msg4 for 4-step RACH and in MsgB for 2-step RACH. Small data with subsequent data can be transmitted during random access procedure.

BRIEF DESCRIPTION OF THE SEVERAL VIEWS OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field may obtain other figures according to these figures without paying the premise.

DESCRIPTION OF SPECIFIC EMBODIMENTS OF THE INVENTION

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
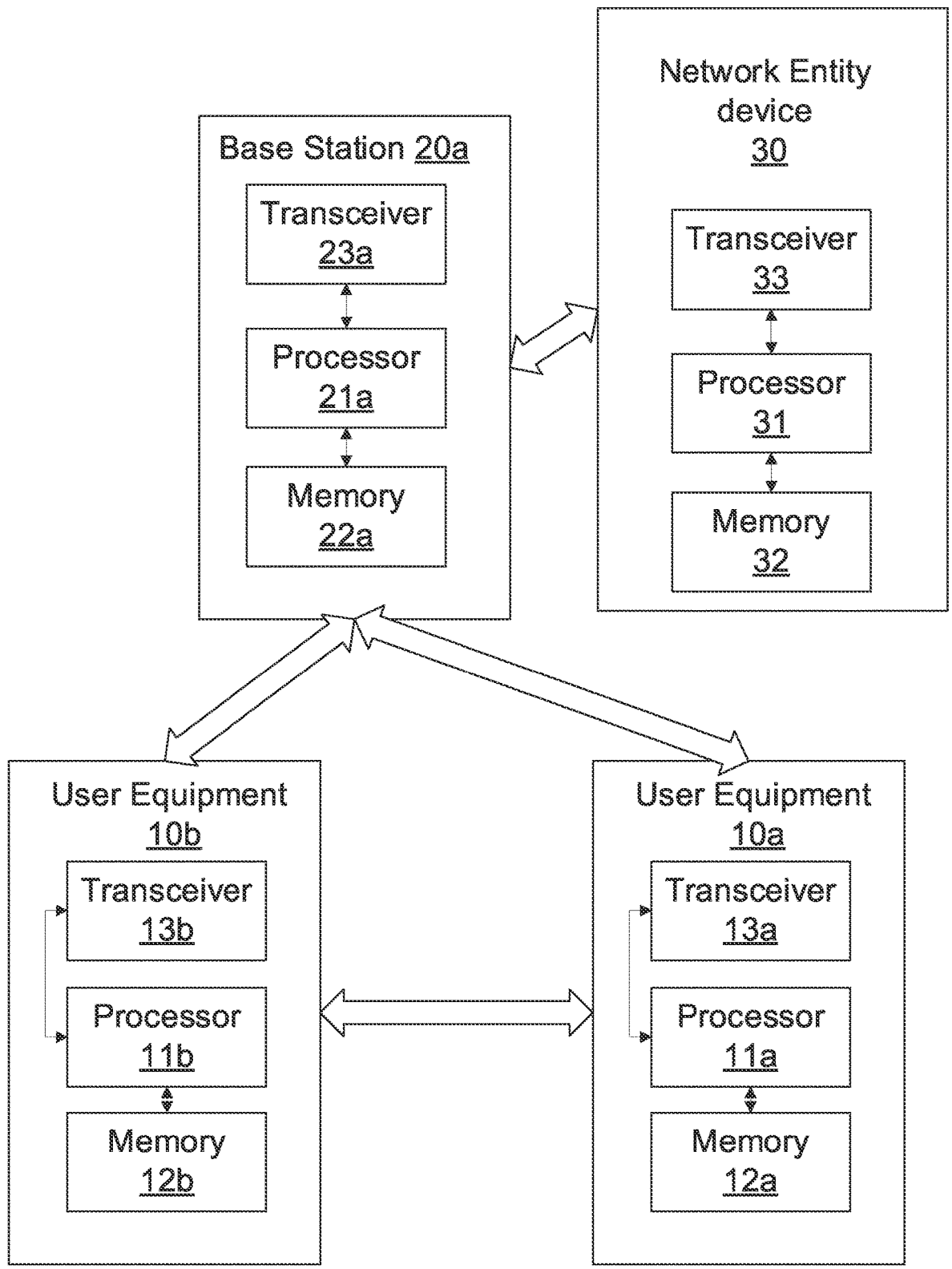
FIG. 1 illustrates a schematic view of a telecommunication system.

With reference to FIG. 1, a telecommunication system including a UE 10a, a UE 10b, a base station (BS) 20a, and a network entity device 30 executes the disclosed method according to an embodiment of the present disclosure. FIG. 1 is shown for illustrative not limiting, and the system may comprise more UEs, BSs, and CN entities. Connections between devices and device components are shown as lines and arrows in the FIGs. The UE 10a may include a processor 11a, a memory 12a, and a transceiver 13a. The UE 10b may include a processor 11b, a memory 12b, and a transceiver 13b. The base station 20a may include a processor 21a, a memory 22a, and a transceiver 23a. The network entity device 30 may include a processor 31, a memory 32, and a transceiver 33. Each of the processors 11a, 11b, 21a, and 31 may be configured to implement proposed functions, procedures and/or methods described in the description. Layers of radio interface protocol may be implemented in the processors 11a, 11b, 21a, and 31. Each of the memory 12a, 12b, 22a, and 32 operatively stores a variety of programs and information to operate a connected processor. Each of the transceivers 13a, 13b, 23a, and 33 is operatively coupled with a connected processor, transmits and/or receives radio signals or wireline signals. The UE 10a may be in communication with the UE 10b through a sidelink. The base station 20a may be an eNB, a gNB, or one of other types of radio nodes, and may configure radio resources for the UE 10a and UE 10b.

Each of the processors 11a, 11b, 21a, and 31 may include an application-specific integrated circuit (ASICs), other chipsets, logic circuits and/or data processing devices. Each of the memory 12a, 12b, 22a, and 32 may include read-only memory (ROM), a random access memory (RAM), a flash memory, a memory card, a storage medium and/or other storage devices. Each of the transceivers 13a, 13b, 23a, and 33 may include baseband circuitry and radio frequency (RF) circuitry to process radio frequency signals. When the embodiments are implemented in software, the techniques described herein may be implemented with modules, procedures, functions, entities, and so on, that perform the functions described herein. The modules may be stored in a memory and executed by the processors. The memory may be implemented within a processor or external to the processor, in which those may be communicatively coupled to the processor via various means are known in the art.

The network entity device 30 may be a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

An example of the UE in the description may include one of the UE 10a or UE 10b. An example of the base station in the description may include the base station 20a. Uplink (UL) transmission of a control signal or data may be a transmission operation from a UE to a base station. Downlink (DL) transmission of a control signal or data may be a transmission operation from a base station to a UE. A DL control signal may comprise downlink control information (DCI) or a radio resource control (RRC) signal, from a base station to a UE.

Figure 2:
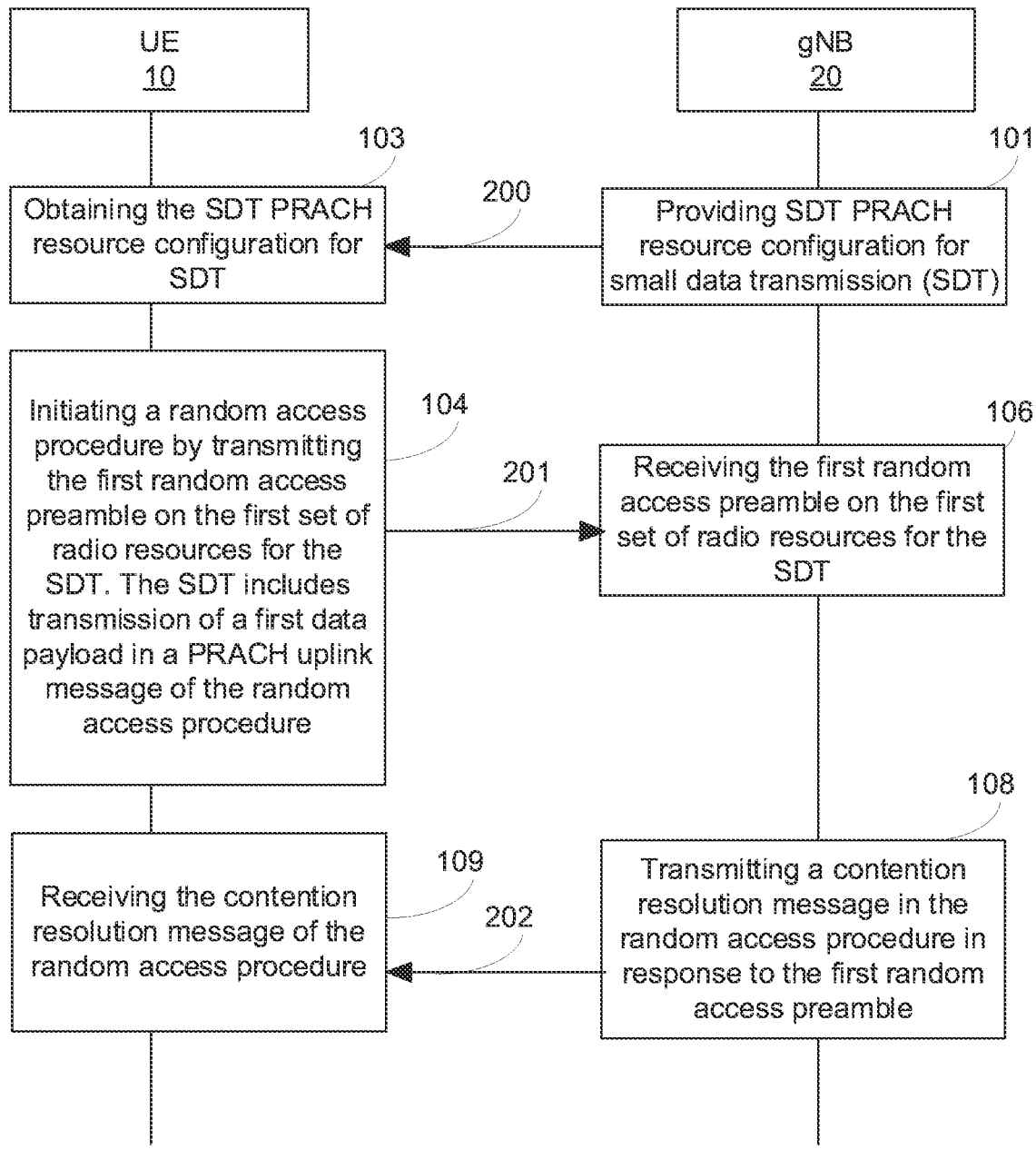
FIG. 2 illustrates a schematic view showing a small data transmission method according to an embodiment of the invention.

With reference to FIG. 2, a gNB 20 executes a small data transmission method. The gNB 20 may comprise an embodiment of the base station 20*a*. Note that although the gNB 20 is described as an example in the description, the small data transmission method may be executed by a base station, such as another gNB, an eNB, a base station integrating an eNB and a gNB, or a base station for beyond 5G technologies. A UE 10 executes a small data transmission method. The UE 10 may comprise an embodiment of the UE 10*a* or UE 10*b*.

The gNB 20 may provide the UE 10 with small data transmission (SDT) physical random access channel (PRACH) resource configuration 200 for small data transmission (101).

The UE 10 obtains the SDT PRACH resource configuration for small data transmission (103). The SDT PRACH resource configuration comprises at least one of a first random access preamble or a first set of radio resources for transmission of the first random access preamble and is differentiated from non-SDT PRACH resource configuration. The gNB 20 determines that the small data transmission is requested based on the received first random access preamble on the SDT PRACH resource. The SDT PRACH resource configuration comprises one of 2-step SDT PRACH resource configuration or 4-step SDT PRACH resource configuration. The 2-step SDT PRACH resource configuration is differentiated from the 4-step SDT PRACH resource configuration for determination as to whether the UE supports a 2-step SDT procedure or a 4-step SDT procedure.

The UE 10 initiates a random access procedure by transmitting the first random access preamble 201 on the first set of radio resources for the SDT (104). The small data transmission includes transmission of a first data payload in a PRACH uplink message of the random access procedure.

The gNB 20 receives the first random access preamble 201 on the first set of radio resources for the SDT in the random access procedure (106).

The gNB 20 transmits a contention resolution message 202 in the random access procedure in response to the first random access preamble (108). The contention resolution message 202 comprises a signaling regarding the small data transmission. The PRACH uplink message may comprise MSG3 in a 4-step random access procedure, and the contention resolution message comprises a MSG4 in a 4-step random access procedure. The PRACH uplink message may be included in MSGA in a 2-step random access procedure, and the contention resolution message may be included in a MSGB in a 2-step random access procedure.

The UE 10 receives the contention resolution message 202 of the random access procedure in response to the first random access preamble (109).

An embodiment of the invention provides a general procedure for small data transmission during random access procedure. The small data transmission comprises a RACH-based scheme and a configured grant (CG)-based scheme.

Embodiment 1

Figure 3:
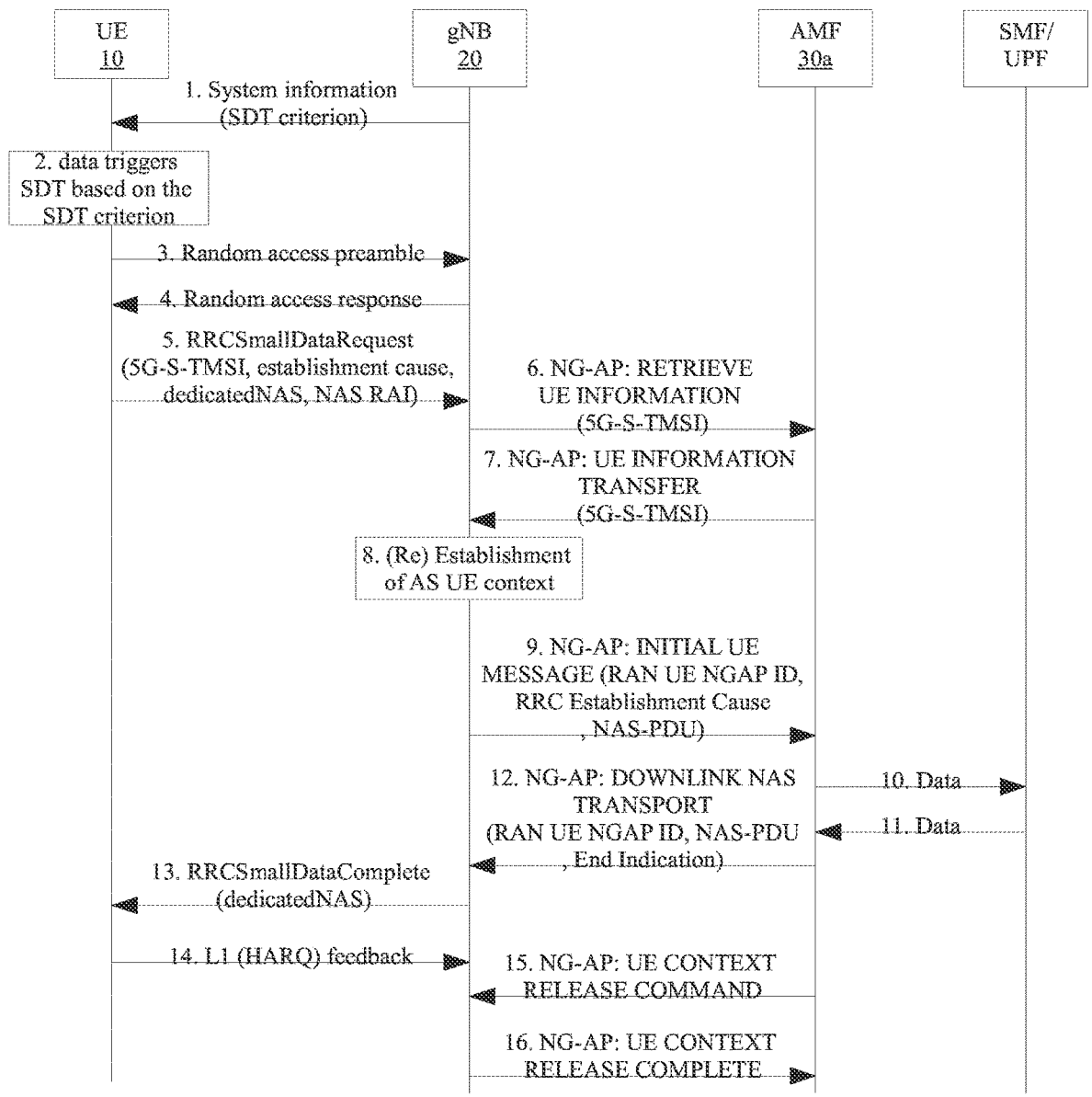
FIG. 3 illustrates a schematic view showing control plane small data transmission for only one PDU by 4-step RACH.

In this embodiment, UL data which is encrypted in one non-access stratum (NAS) PDU is transmitted with an Msg3 message. An Msg5 message is replaced by a layer one (L1) hybrid automatic repeat request (HARQ) acknowledgement or negative acknowledgement to reduce power consumption of the UE 10. The detailed procedure of an embodiment of the disclosed method is depicted in FIG. 3. The UE 10 is in the RRC idle state from step 1 to step 16.

Step 1: The gNB 20 broadcasts an SDT criterion in system information, such as a system information block (SIB). The SDT criterion may include the limitation of radio resources for SDT transmission, such as a number of resource blocks, a transport block size, or a total data size which can be transmitted in the small data transmission. The SDT criterion may also be criterion for only one PDU and for multiple PDUs. The SDT may be performed for transmission of a plurality of PDUs including a first transmitted PDU and one or more subsequent PDUs. The SDT criterion may be applied to subsequent SDT in RRC Idle or RRC inactive.

Step 2: The UE 10 triggers a control plane SDT procedure based on the SDT criterion. The control plane SDT procedure may be realized in a random access procedure (i.e., a RACH procedure).

Step 3: The UE 10 transmits a random access preamble Msg1 to the gNB 20. The SDT PRACH resource configuration may be separated from legacy PRACH resource configuration, such that the gNB 20 can determine whether the UE 10 can perform SDT or a legacy RACH procedure after receiving Msg1. The SDT PRACH resource configuration may comprise new preamble sequence, new radio resource, new bandwidth part (BWP), or a maximum size for Msg3 with UL data (e.g., the first data payload). The new preamble sequence may be a preamble sequence specific to the SDT, the new radio resource may be a radio resource specific to the SDT, the new BWP may be a BMP specific to the SDT, and the maximum size for Msg3 may be a maximum size of Msg3 for the SDT.

Step 4: The gNB 20 feedbacks a random access response (RAR) Msg2 to the UE 10. The gNB 20 may grant radio resources for the UE 10 to transmit UL data (e.g., the first data payload).

Step 5: The UE 10 transmits an RRCSmallDataRequest message Msg3 with a NAS PDU (DedicatedNAS-Message) that contains UL Data. The RRCSmallDataRequest message includes 5G-S-TMSI serving as the UE identity of the UE 10. The 5G-S-TMSI stands for 5G S-temporary mobile subscriber identity, which is a shortened version of the 5G globally unique temporary UE identity (5G-GUTI). The establishment cause may be configured as mobile originated (MO) SDT. The NAS Release Assistance Information (RAI) is a 2-bit information. When NAS RAI==01 is included in the NAS PDU, the NAS RAI states that no further Uplink and DL data transmissions are expected. When NAS RAI==10 is included in the NAS PDU, the NAS RAI states that only a single DL data transmission and no further UL data transmission subsequent to the UL data transmission is expected.

Step 6: The gNB 20 acquires UE capabilities of the UE 10 from Access and Mobility Management Function (AMF) 30*a* by sending a message NG-AP: RETRIEVE UE INFORMATION. The NG-AP: RETRIEVE UE INFORMATION message includes 5G-S-TMSI serving as the UE identity of the UE 10.

Step 7: The AMF 30*a* feedbacks the UE capabilities and UE level QoS to the gNB 20 by sending a message NG-AP: UE INFORMATION TRANSFER. The NG-AP: UE INFORMATION TRANSFER message includes 5G-S-TMSI serving as the UE identity of the UE 10.

Step 8: The NR Uu part of UE context of the UE 10 is established or re-established by the gNB 20 at this point.

Step 9: The gNB 20 transmits an NG-AP: INITIAL UE MESSAGE with the NAS PDU that contains a CONTROL PLANE SERVICE REQUEST including a 5GSM DATA TRANSPORT carrying the UL Data (e.g., the first data payload). The INITIAL UE MESSAGE may comprise a RAN UE NGAP ID (to establish N2 logical channel), RRC establishment cause (to notify AMF 30a that this is data transmission using SDT), etc.

Step 10: The AMF 30a sends a PDU Session ID and the UL data to a session management function (SMF), and the SMF forwards the UL data to a UPF.

Step 11: If DL data for the UE 10 is available, the UPF forwards the DL data to the SMF and the SMF forwards the DL data to the AMF 30a.

Step 12: The AMF 30a transmits a message NG-AP: DOWNLINK NAS TRANSPORT with a NAS PDU carrying the DL data. The DOWNLINK NAS TRANSPORT message may comprise a RAN UE NGAP ID (to identify N2 logical channel) and End indication to notify the gNB 20 that there is no further DL data in the SDT.

Step 13: The gNB 20 transmits an RRCSmallDataComplete message Msg4 to the UE 10. The RRCSmallDataComplete message may comprise UL NAS PDU confirmation for the UL Data and the NAS PDU (i.e., information element DedicatedNAS-Message) with DL data. The RRC SDT complete message RRCSmallDataComplete indicates termination of the small data transmission and contains a downlink data payload (e.g., the DL data) which is carried in a non-access stratum (NAS) message for the UE 10.

Step 14: The UE 10 reports DL HARQ feedback to the gNB 20. The DL HARQ feedback is for acknowledging the Msg4 RRCSmallDataComplete message.

Step 15: The AMF 30a transmits an NG-AP: UE CONTEXT RELEASE COMMAND to release the N2 logical channel.

Step 16: After successfully receiving the DL HARQ feedback, the gNB 20 releases UE context of the UE 10 and reports a message NG-AP: UE CONTEXT RELEASE COMPLETE to the AMF 30a.

Note that the UE 10 doesn't need to enter an RRC connected state if the SDT can be completed during the RACH procedure.

Embodiment 1a

In this embodiment, a portion of UL data which can be encrypted in a NAS PDU is transmitted with Msg3, and the remaining portions of the UL data are transmitted in preconfigured UL resources (PUR).

Figure 4:
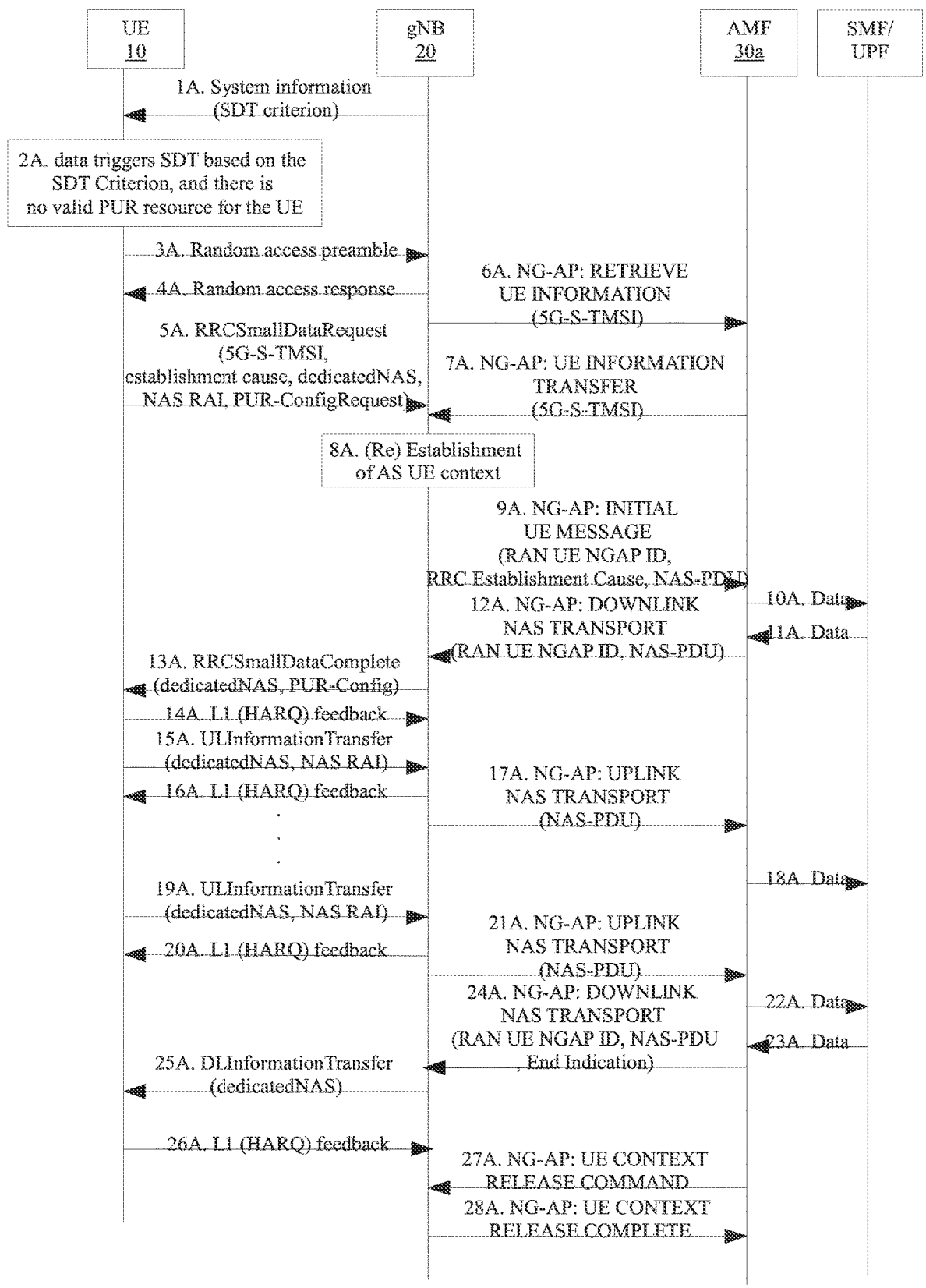
FIG. 4 illustrates a schematic view showing control plane small data transmission for multiple PDUs by 4-step RACH.

In an embodiment, when a data size associated with the small data transmission requires more protocol data units (PDUs), the UE transmits an indication to indicate a request for a subsequent data transmission for the small data transmission. For example, the indication may comprise NAS RAI. The indication may be the buffer status reporting (BSR) which reports the data volume of the remaining portions of the UL data. The detailed procedure of an embodiment of the disclosed method is depicted in FIG. 4. The UE 10 is in the RRC idle state from step 1A to step 28A.

Step 1A: The gNB 20 broadcasts an SDT criterion in system information, such as a system information block (SIB).

Step 2A: The UE receives the broadcast system information, such as the SIB, indicating the SDT criterion. The UE 10 triggers a control plane SDT procedure based on the SDT criterion. Currently, no valid PUR resource is configured for the UE 10.

Step 3A: The UE 10 transmits a random access preamble Msg1 to the gNB 20.

Step 4A: The gNB 20 feedbacks a random access response (RAR) Msg2 to the UE 10. The gNB 20 may grant radio resources for the UE 10 to transmit UL data (e.g., the first data payload).

Step 5A: The UE 10 transmits an RRCSmallDataRequest message Msg3 with a NAS PDU (DedicatedNAS-Message) that contains a portion of the UL Data (e.g., a portion of uplink data payload in the SDT). The RRCSmallDataRequest message includes 5G-S-TMSI serving as the UE identity of the UE 10. The establishment cause may be configured as mobile originated (MO) SDT (with subsequent data transmission). The NAS RAI in the message may be configured to inform the subsequent data transmission. For example, NAS RAI=11 may be configured to indicate that there is further UL data transmission subsequent to the UL data transmission and associated DL data transmission is expected. RRCSmallDataRequest message may also comprise a PUR-ConfigRequest IE to request UL resources for transmitting the subsequent data transmission. The PUR-ConfigRequest IE may comprise a number of PUR occasions, periodicity of PUR occasions, or a TBS of PUR resources. TBS stands for transport block (TB) size.

Step 6A: The gNB 20 acquires UE capabilities of the UE 10 from AMF 30a by sending a message NG-AP: RETRIEVE UE INFORMATION. The NG-AP: RETRIEVE UE INFORMATION message includes 5G-S-TMSI serving as the UE identity of the UE 10.

Step 7A: The AMF 30a reports the UE capabilities and UE level QoS to the gNB 20 by sending a message NG-AP: UE INFORMATION TRANSFER. The NG-AP: UE INFORMATION TRANSFER message includes 5G-S-TMSI serving as the UE identity of the UE 10.

Step 8A: The NR Uu part of the UE context of the UE 10 is established or re-established by the gNB 20 at this point.

Step 9A: The gNB 20 transmits an NG-AP: INITIAL UE MESSAGE with a NAS PDU that contains a CONTROL PLANE SERVICE REQUEST including a 5GSM DATA TRANSPORT carrying the UL Data (e.g., the first data payload). The INITIAL UE MESSAGE may comprise a RAN UE NGAP ID (to establish N2 logical channel), RRC establishment cause (to notify AMF 30a that this is data transmission using SDT), etc.

Step 10A: The AMF 30a sends a PDU Session ID and the UL data to the SMF, and the SMF forwards the UL data to the UPF.

Step 11A: If DL data for the UE 10 is available, the UPF forwards the DL data to the SMF and the SMF forwards the DL data to the AMF 30a.

Step 12A: The AMF 30a transmits a message NG-AP: DOWNLINK NAS TRANSPORT with a NAS PDU carrying the DL data. The DOWNLINK NAS TRANSPORT message may comprise a RAN UE NGAP ID (to identify N2 logical channel).

Step 13A: The gNB 20 transmits an RRCSmallDataComplete message Msg4 to the UE 10. The RRCSmallDataComplete message may comprise UL NAS PDU confirmation for the UL Data, the NAS PDU (DedicatedNAS-Message) with the DL data, and the PUR-Config IE. The PUR-Config IE includes PUR configuration to configure PUR resources for the subsequent data transmission in the SDT. The PUR-Config IE may comprise a time alignment timer, a time offset for the first PUR occasion, periodicity of the PUR, a number of PURs, a modulation index and a TBS index for PUR, etc. The RRCSmallDataComplete message Msg4 serves as the contention resolution message that comprises configuration of configured uplink resources for subsequent transmission in the small data transmission. The RRC SDT complete message RRCSmallDataComplete indicates termination of the small data transmission and contains a downlink data payload (e.g., the DL data) which is carried in a non-access stratum (NAS) message for the UE 10. In the embodiment, the RRC SDT complete message RRCSmallDataComplete serves as the contention resolution message 202 in FIG. 2. In an embodiment, the configured uplink resources comprise configured grant (CG) resources for subsequent transmission in the small data transmission. In another embodiment, the configured uplink resources comprise pre-configured uplink resources (PUR) for subsequent transmission in the small data transmission. The UE 10 may perform the subsequent data transmission by transmitting a second data payload of the small data transmission in a subsequent PDU on the configured uplink resources in an RRC connected state. Note that the periodicity of the PUR may be a value ranging from several 10 ms to several seconds.

Step 14A: After successfully receiving RRCSmallDataComplete message, the UE 10 starts the time alignment timer and reports DL HARQ feedback to the gNB 20. The DL HARQ feedback is for acknowledging the Msg4 RRCSmallDataComplete message. The UE 10 use the time alignment timer to locate the configured uplink resources for the subsequent data transmission in the SDT. Note that the time alignment timer is re-started after receiving L1 HARQ feedback from the gNB 20.

Step 15A: The UE 10 transmits an ULInformationTransfer message with a NAS PDU (DedicatedNAS-Message) that contains subsequent UL Data (e.g., a remaining portion of uplink data payload in the SDT). The NAS RAI in the message may be configured to inform the subsequent data transmission.

Step 16A: The gNB 20 may report UL HARQ feedback to the UE 10. The UL HARQ feedback is for acknowledging the ULInformationTransfer message in step 15A.

Step 17A: The gNB 20 transmits an NG-AP: UPLINK NAS TRANSPORT message with a NAS PDU carrying the subsequent UL Data (e.g., a remaining portion of uplink data payload in the SDT).

Step 18A: Similar to step 10A.

Step 19A: Similar to step 15A except that the NAS RAI is configured to inform that there is no further subsequent data transmission in the SDT.

Step 20A: Similar to step 16A. The gNB 20 may report UL HARQ combination feedback for acknowledging multiple ULInformationTransfer messages. The HARQ combination feedback is a HARQ feedback responding for multiple UL transport blocks.

Step 21A: Similar to step 17A.

Step 22A: Similar to step 10A.

Step 23A: Similar to step 11A.

Step 24A: Similar to step 12A except that the DOWNLINK NAS TRANSPORT message comprises End indication to notify the gNB 20 that there is no further DL data in the SDT.

Step 25A: The gNB 20 transmits a DLInformationTransfer message to the UE 10. The DLInformationTransfer message comprises the NAS PDU (DedicatedNAS-Message) with the DL data.

Step 26A: The UE 10 reports DL HARQ feedback to the gNB 20. The DL HARQ feedback is for acknowledging the DLInformationTransfer message.

Step 27A: The AMF 30a transmits an NG-AP: UE CONTEXT RELEASE COMMAND to release the N2 logical channel.

Step 28A: After successfully receiving the DL HARQ feedback, the gNB 20 releases UE context of the UE 10 and reports a message NG-AP: UE CONTEXT RELEASE COMPLETE to the AMF 30a.

Note that the UE 10 doesn't need to enter an RRC connected state if the SDT with multiple PDUs can be completed during the RACH procedure.

Embodiment 2

Figure 5:
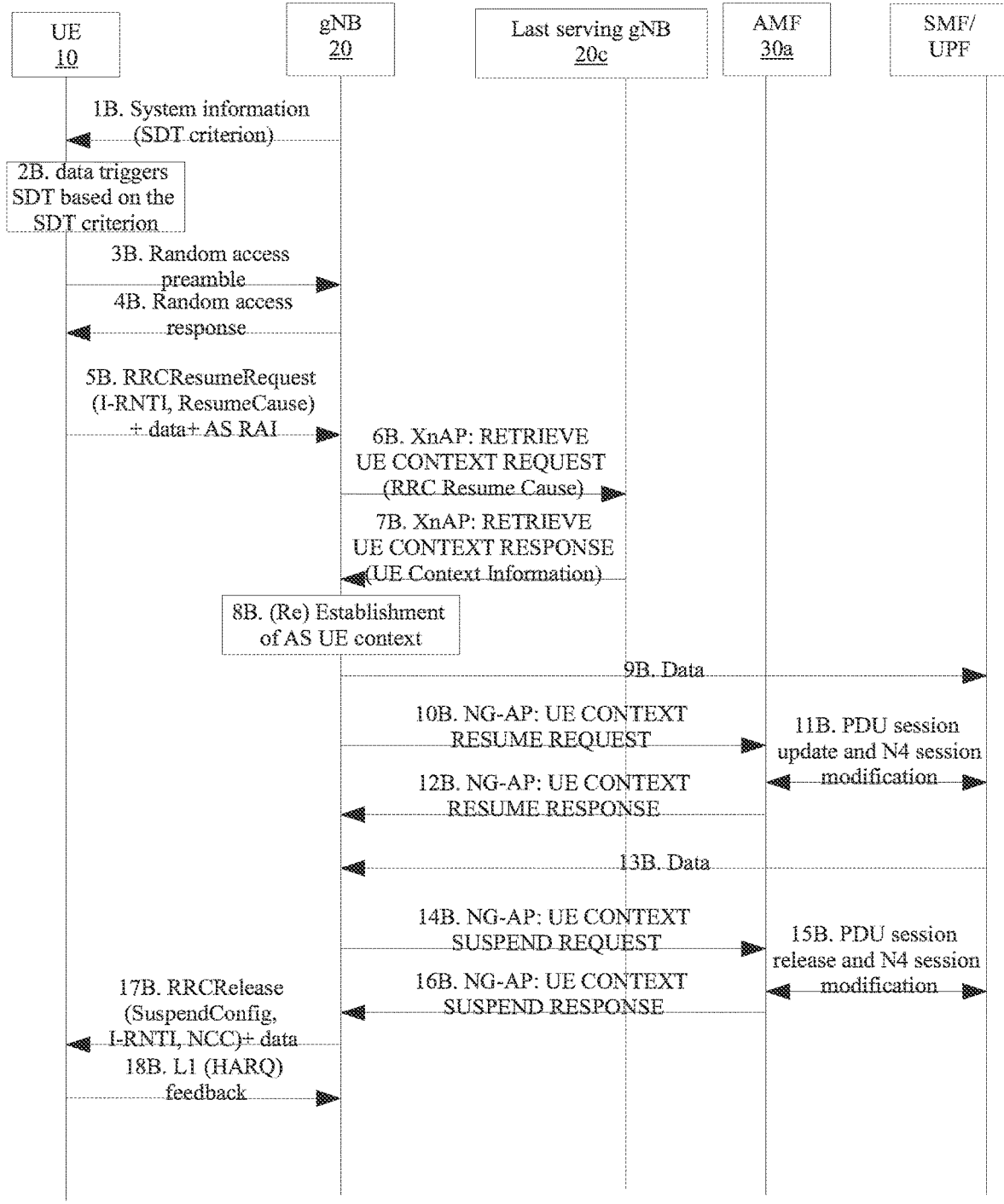
FIG. 5 illustrates a schematic view showing user plane small data transmission for only one PDU by 4-step RACH.

In this embodiment, UL data is multiplexed with Msg3 (i.e. RRCResumeRequest) and corresponding DL data is multiplexed with Msg4 (i.e. RRCRelease). The detailed procedure of an embodiment of the disclosed method is depicted in FIG. 5. The UE 10 is in the RRC inactive state from step 1B to step 18B.

Step 1B: The gNB 20 broadcasts the SDT criterion in system information, such as a system information block (SIB).

Step 2B: The UE receives the broadcast system information, such as the SIB, indicating the SDT criterion. The UE 10 triggers a user plane SDT procedure based on the SDT criterion.

Step 3B: The UE 10 transmits a random access preamble Msg1 to the gNB 20.

Step 4B: The gNB 20 feedbacks a random access response (RAR) Msg2 to the UE 10. The gNB 20 may grant radio resources for the UE 10 to transmit Msg3 and data.

Step 5B: The UE 10 transmits Msg3 RRCResumeRequest message to the gNB 20, including its I-RNTI, the resume cause, and an authentication token. The UE 10 resumes all SRBs and DRBs, derives new security keys using the NextHopChainingCount (NCC) provided in the RRCRelease message of the previous connection and re-establishes the AS security. User data of the UE 10 including UL data is ciphered and transmitted on dedicated traffic channel (DTCH) multiplexed with the RRCResumeRequest message on common control channel (CCCH). The RRCResumeRequest message includes UL data as the first data payload from the UE 10 for the SDT. The UE 10 also transmits AS RAI in the message to indicate no further UL data and only one associated DL data. The Msg3 RRCResumeRequest message includes UL data as the first data payload from the UE 10 for the SDT.

Step 6B: The gNB 20, if being able to resolve the gNB identity contained in the I-RNTI, transmits an Xn Application Protocol (XnAP): RETRIEVE UE CONTEXT REQUEST message to request the last serving gNB 20c to provide UE Context of the UE 10.

Step 7B: The last serving gNB 20c transmits an XnAP: RETRIEVE UE CONTEXT RESPONSE message to provide UE context of the UE 10.

Step 8B: The NR Uu part of the UE context of the UE 10 is established or re-established by the gNB 20 at this point.

Step 9B: The UL data is delivered to the UPF.

Step 10B: The gNB 20 transmits an NG-AP: UE CONTEXT RESUME REQUEST message to the AMF 30a to resume the connection. Because the AS RAI indicates no further UL data and one more DL data, the gNB 20 also transmits a Suspend Request Indication to request for immediate transition to RRC Inactive with Suspend.

Step 11B: The AMF 30a is aware of DL data, and the AMF 30a requests the SMF to resume a PDU session.

Step 12B: The AMF 30a transmits an NG-AP: UE CONTEXT RESUME RESPONSE message to the gNB 20.

Step 13B: Because the UE 10 includes the AS RAI indicating only a single DL data transmission subsequent to the UL data transmission, the gNB 20 waits for the DL data to arrive.

Step 14B: The gNB 20 transmits the NG-AP: UE CONTEXT SUSPEND REQUEST message to inform AMF 30*a* that the RRC connection is being suspended.

Step 15B: The AMF 30*a* requests the SMF to suspend the PDU session, and the SMF requests the UPF to release tunnel information for the UE 10.

Step 16B: The AMF 30*a* transmits an NG-AP: UE CONTEXT SUSPEND RESPONSE message to the gNB 20.

Step 17B: The gNB 20 sends the Msg4 RRCRelease message to keep the UE 10 in RRC Inactive. The RRCRelease message may include SuspendConfig, the I-RNTI, the NCC stored in the UE 10. The DL data is sent ciphered on DTCH multiplexed with the RRCRelease message on dedicated control channel (DCCH). The RRC release message RRCRelease responds to the PRACH uplink message (i.e., the Msg3 RRCResumeRequest message) and keeps the UE 10 stay at an RRC inactive state. The RRC release message contains a downlink data payload (e.g., the DL data) for the UE 10.

Step 18B: The UE 10 reports DL HARQ feedback to the gNB 20. The DL HARQ feedback is for acknowledging the Msg4 RRCRelease message. Note that the UE 10 remains in RRC inactive state if the SDT can be completed during the RACH procedure.

Embodiment 2a

Figure 6:
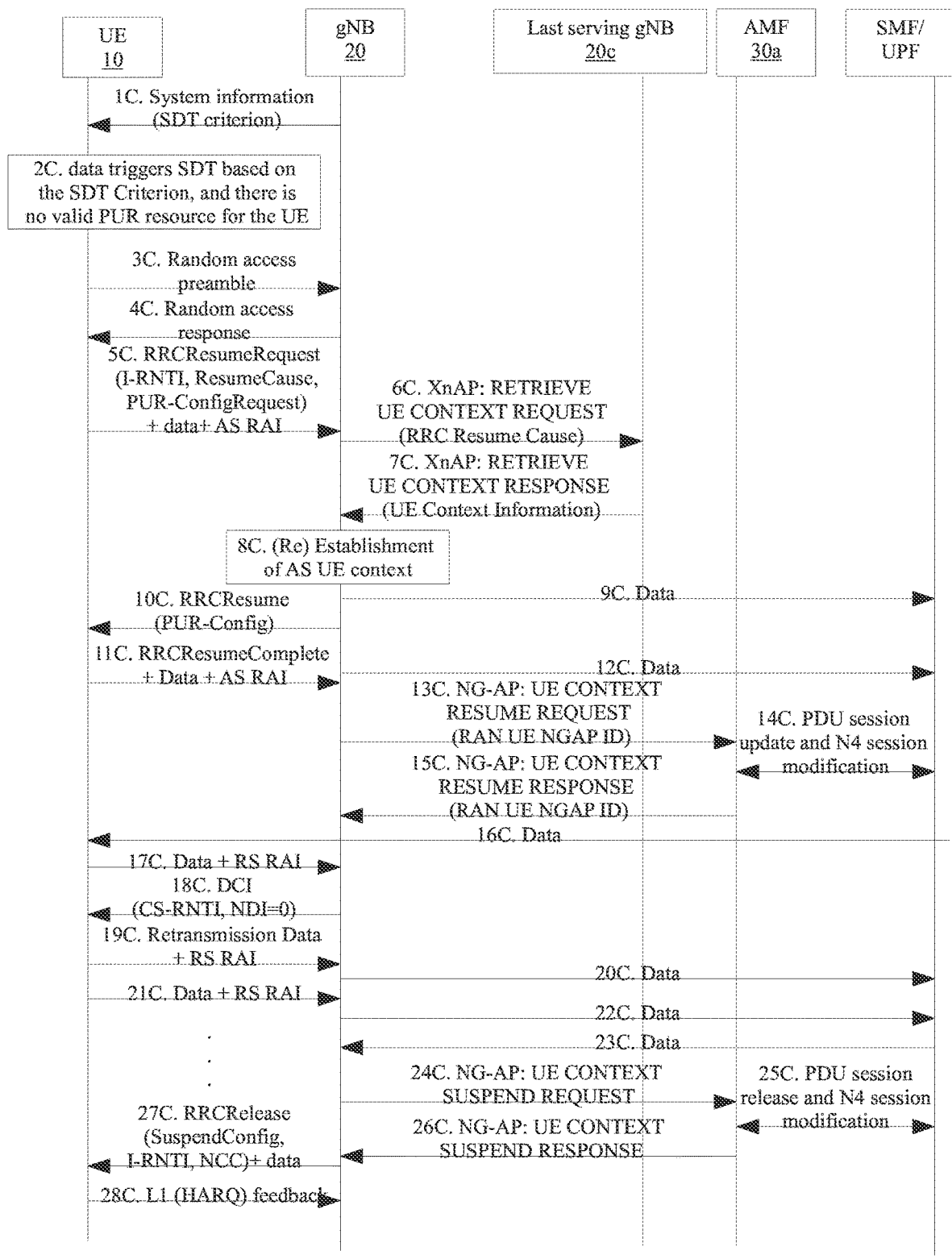
FIG. 6 user plane small data transmission for multiple PDUs by 4-step RACH where UE enters RRC connected to transmit subsequent data.

In this embodiment, a portion of UL data is multiplexed with Msg3 (i.e. RRCResume message), and the remaining portions of the UL data are transmitted in PUR after entering RRC connected state. The detailed procedure of an embodiment of the disclosed method is depicted in FIG. 6. The UE 10 is in the RRC inactive state from step 10 to step 100. The UE 10 is in the RRC connected state from step 11C to step 28C.

Step 10: The gNB 20 broadcasts the SDT criterion in system information, such as a system information block (SIB).

Step 2C: The UE receives the broadcast system information, such as the SIB, indicating the SDT criterion. The UE 10 triggers a control plane SDT procedure based on the SDT criterion. Currently, no valid PUR resource is configured for the UE 10.

Step 3C: The UE 10 transmits a random access preamble Msg1 to the gNB 20.

Step 4C: The gNB 20 feedbacks a random access response (RAR) Msg2 to the UE 10. The gNB 20 may grant radio resources for the UE 10 to transmit UL data (e.g., the first data payload).

Step 5C: The UE 10 transmits Msg3 RRCResumeRequest message to the gNB 20, including its I-RNTI, the resume cause, and an authentication token. The UE 10 resumes all SRBs and DRBs, derives new security keys using the NCC provided in the RRCRelease message of the previous connection and re-establishes the AS security. User data of the UE 10 including UL data is ciphered and transmitted on DTCH multiplexed with the RRCResumeRequest message on CCCH. The Msg3 RRCResumeRequest message includes UL data as the first data payload from the UE 10 for the SDT. The UE 10 also transmits AS RAI and/or BSR in the message to indicate the subsequent data transmission. For example, AS RAI index may be configured as 11 to indicate that there is further UL data transmission subsequent to the UL data transmission and associated DL data transmission is expected. The RRCResumeRequest message may also comprise a PUR-ConfigRequest IE to request UL resources for transmitting the subsequent data transmission. The PUR-ConfigRequest IE may comprise a number of PUR occasions, periodicity of PUR occasions, or a TBS of PUR resources.

Step 6C: The gNB 20, if being able to resolve the gNB identity contained in the I-RNTI, transmits an XnAP: RETRIEVE UE CONTEXT REQUEST message to request the last serving gNB 20*c* to provide UE Context of the UE 10.

Step 7C: The last serving gNB 20*c* transmits an XnAP: RETRIEVE UE CONTEXT RESPONSE message to provide UE context of the UE 10.

Step 8C: The NR Uu part of the UE context of the UE 10 is established or re-established by the gNB 20 at this point.

Step 9C: The UL data is delivered to the UPF.

Step 100: The gNB 20 transmits a Msg4 RRCResume message to the UE 10. The RRCResume message comprises the PUR-Config IE to configure PUR resources for the subsequent data transmission in the SDT. The PUR-Config IE may comprise a time alignment timer, a time offset for the first PUR occasion, periodicity of the PUR, a number of PURs, a modulation index and a TBS index for PUR, etc. The Msg4 RRCResume message serves as the contention resolution message that comprises configuration of configured uplink resources for subsequent transmission in the small data transmission. The RRC resume message RRCResume responds to the PRACH uplink message (i.e., Msg3 RRCResumeRequest message) and keeps the UE 10 to stay in the RRC connected state. The RRC resume message RRCResume contains a downlink data payload (e.g., the DL data) for the UE 10. In the embodiment, the RRC resume message RRCResume serves as the contention resolution message 202 in FIG. 2. In an embodiment, the configured uplink resources comprise configured grant (CG) resources for subsequent transmission in the small data transmission. In another embodiment, the configured uplink resources comprise pre-configured uplink resources (PUR) for subsequent transmission in the small data transmission. The UE 10 may perform the subsequent data transmission by transmitting a second data payload of the small data transmission in a subsequent PDU on the configured uplink resources in an RRC connected state.

Step 11C: The UE 10 transmits Msg5 RRCResumeComplete message to the gNB 20. The RRCResumeComplete message is for acknowledging the RRCResume message, and the RRCResumeComplete message may be also multiplexed with subsequent UL data and AS RAI sub-header. After transmitting RRCResumeComplete message, the UE 10 enters RRC connected state. The RRCResumeComplete message may be transmitted in a UL PDU to include the subsequent UL data of the UE 10 in the SDT.

Step 12C: if there is UL data transmitted in step 11C, the UL data is delivered to the UPF.

Step 13C: The gNB 20 transmits an NG-AP: UE CONTEXT RESUME REQUEST message to the AMF 30*a* to resume the connection. Because the AS RAI indicates further UL data transmission subsequent to the UL data transmission and associated DL data transmission is expected, the gNB 20 does not transmit Suspend Request Indication to request for immediate transition to RRC Inactive with Suspend. Note that the periodicity of the PUR may be a value ranging from several 10 ms to several seconds.

Step 14C: The AMF 30*a* is aware of DL data, and the AMF 30*a* requests the SMF to resume a PDU session.

Step 15C: The AMF 30*a* transmits an NG-AP: UE CONTEXT RESUME RESPONSE message to the gNB 20.

Step 16C: The DL data are delivered from the UPF to the UE 10.

Step 17C: The UE 10 transmits UL data with an AS RAI sub-header which may be configured to inform the subsequent data transmission. The UL data may be transmitted in a UL PDU.

Step 18C: If the gNB 20 cannot successfully receive the UL data, the gNB 20 reports DCI with CS-RNTI and NDI=0.

Step 19C: The UE 10 re-transmits the UL data with an AS RAI sub-header.

Step 20C: If the gNB 20 successfully receives the UL data, the UL data is delivered to the UPF.

Step 21C: Similar to step 17C except that the AS RAI index is configured to inform that there is no further subsequent data transmission in the SDT.

Step 22C: Similar to step 12C.

Step 23C: The DL data are delivered from the UPF to the gNB 20.

Step 24C: The gNB 20 transmits the NG-AP: UE CONTEXT SUSPEND REQUEST message to inform AMF 30a that the RRC connection is suspended.

Step 25C: The AMF 30a requests the SMF to suspend the PDU session, and the SMF requests the UPF to release tunnel information for the UE 10.

Step 26C: The AMF 30a transmits an NG-AP: UE CONTEXT SUSPEND RESPONSE message to the gNB 20.

Step 27C: The gNB 20 sends the RRCRelease message to release the UE connection. The RRCRelease message may include SuspendConfig, the I-RNTI, the NCC stored in the UE 10. The DL data is sent ciphered on DTCH multiplexed with the RRCRelease message on DCCH.

Step 28C: The UE 10 reports DL HARQ feedback to the gNB 20. The DL HARQ feedback is for acknowledging the RRCRelease message. After transmitting DL HARQ feedback, the UE 10 enters into RRC inactive state. Note that the UE 10 needs to enter an RRC connected state because SDT with multiple PDUs cannot be completed during the RACH procedure.

Embodiment 2b

Figure 7:
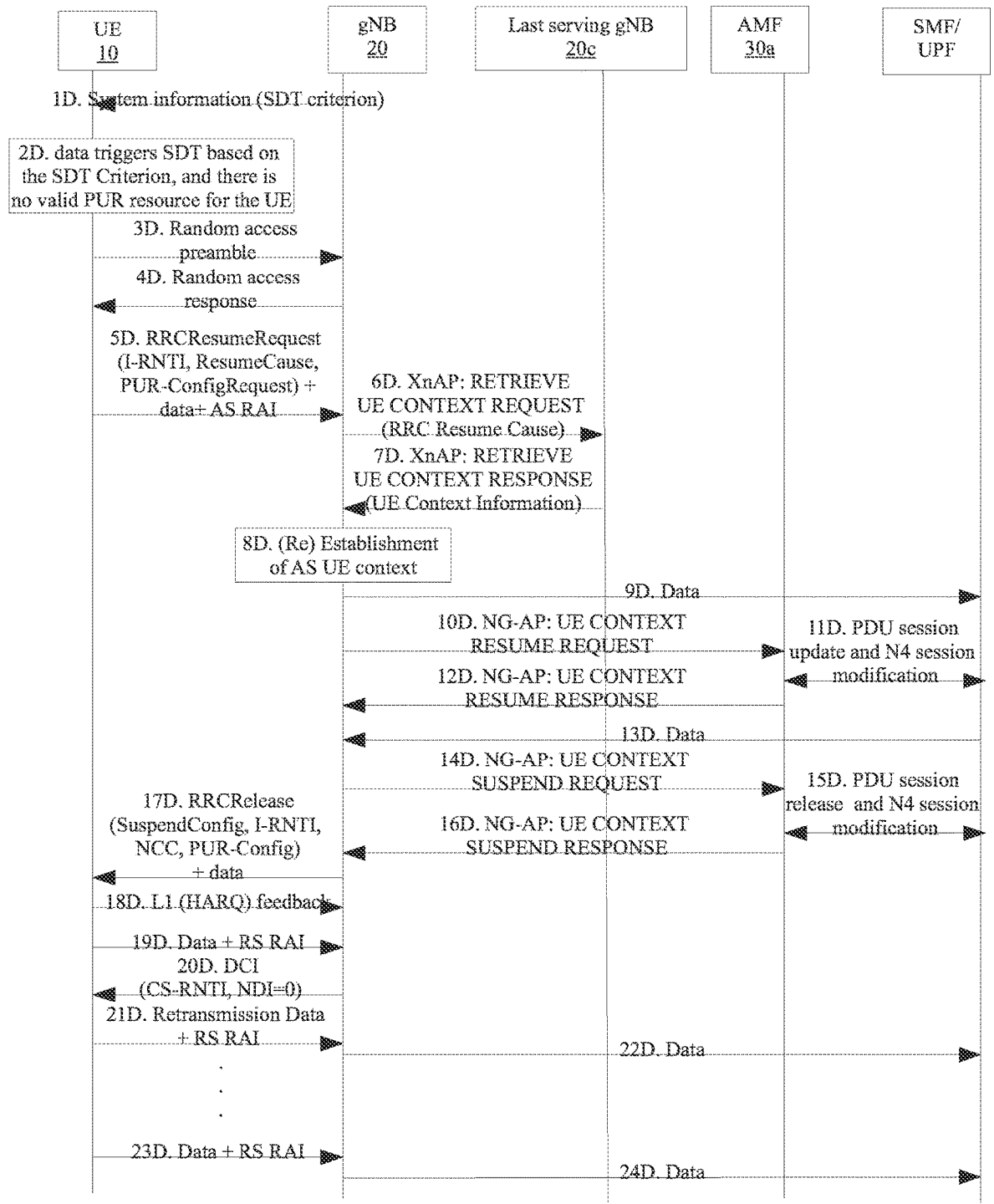
FIG. 7 illustrates a schematic view showing user plane small data transmission for multiple PDUs by 4-step RACH where a UE remains in RRC inactive to transmit subsequent data.

In this embodiment, a portion of UL data is multiplexed with Msg3 (i.e. RRCResume message), and the UE 10 stays in RRC inactive state to transmit the remaining portions of the UL data in PUR. The detailed procedure of an embodiment of the disclosed method is depicted in FIG. 7. The UE 10 is in the RRC inactive state from step 1D to step 24D.

Step 1 D: The gNB 20 broadcasts the SDT criterion in system information, such as a system information block (SIB).

Step 2D: The UE receives the broadcast system information, such as the SIB, indicating the SDT criterion. The UE 10 triggers a user plane SDT procedure based on the SDT criterion. Currently, no valid PUR resource is configured for the UE 10.

Step 3D: The UE 10 transmits a random access preamble Msg1 to the gNB 20.

Step 4D: The gNB 20 feedbacks a random access response (RAR) Msg2 to the UE 10. The gNB 20 may grant radio resources for the UE 10 to transmit Msg3 and data.

Step 5D: The UE 10 transmits Msg3 RRCResumeRequest message to the gNB 20, including its I-RNTI, the resume cause, and an authentication token. The UE 10 resumes all SRBs and DRBs, derives new security keys using the NCC provided in the RRCRelease message of the previous connection and re-establishes the AS security. User data of the UE 10 including UL data is ciphered and transmitted on DTCH multiplexed with the RRCResumeRequest message on CCCH. The Msg3 RRCResumeRequest message includes UL data as the first data payload from the UE 10 for the SDT. The AS RAI index in the Msg3 RRCResumeRequest message may be configured to indicate that there is further UL data transmission subsequent to the UL data transmission and "no" associated DL data transmission is expected. The RRCResumeRequest message may also comprise a PUR-ConfigRequest IE to request UL resources for transmitting the subsequent UL data transmission.

Step 6D: The gNB 20, if being able to resolve the gNB identity contained in the I-RNTI, transmits an XnAP: RETRIEVE UE CONTEXT REQUEST message to request the last serving gNB 20c to provide UE Context of the UE 10.

Step 7D: The last serving gNB 20c transmits an XnAP: RETRIEVE UE CONTEXT RESPONSE message to provide UE context of the UE 10.

Step 8D: The NR Uu part of the UE context of the UE 10 is established or re-established by the gNB 20 at this point.

Step 9D: The UL data is delivered to the UPF.

Step 10D: The gNB 20 transmits an NG-AP: UE CONTEXT RESUME REQUEST message to the AMF 30a to resume the connection. Because the AS RAI indicates no further UL data and one more DL data, the gNB 20 also transmits a Suspend Request Indication to request for immediate transition to RRC Inactive with Suspend.

Step 11D: The AMF 30a is aware of DL data, and the AMF 30a requests the SMF to resume a PDU session.

Step 12D: The AMF 30a transmits an NG-AP: UE CONTEXT RESUME RESPONSE message to the gNB 20.

Step 13D: Because the UE 10 includes the AS RAI indicating only a single DL data transmission subsequent to the UL data transmission, the gNB 20 waits for the DL data to arrive.

Step 14D: The gNB 20 transmits the NG-AP: UE CONTEXT SUSPEND REQUEST message to inform AMF 30a that the RRC connection is suspended.

Step 15D: The AMF 30a requests the SMF to suspend the PDU session, and the SMF requests the UPF to release tunnel information for the UE 10.

Step 16D: The AMF 30a transmits an NG-AP: UE CONTEXT SUSPEND RESPONSE message to the gNB 20.

Step 17D: The gNB 20 sends the Msg4 RRCRelease message to keep the UE 10 in RRC Inactive. The RRCRelease message may include SuspendConfig, the I-RNTI, the NCC stored in the UE 10, and the PUR-Config IE. The PUR-Config IE comprises a configuration that configures PUR resources for the subsequent UL data transmission in the SDT. The DL data is sent ciphered on DTCH multiplexed with the RRCRelease message on DCCH. The Msg4 RRCRelease message serves as the contention resolution message that comprises configuration of configured uplink resources for subsequent transmission in the small data transmission. The RRC release message RRCRelease responds to the PRACH uplink message (i.e., the Msg3 RRCResumeRequest message) and keeps the UE 10 stay at an RRC inactive state. The RRC release message contains a downlink data payload (e.g., the DL data) for the UE 10. In the embodiment, the RRC release message RRCRelease serves as the contention resolution message 202 in FIG. 2. In an embodiment, the configured uplink resources comprise configured grant (CG) resources for subsequent transmission in the small data transmission. In another embodiment, the configured uplink resources comprise pre-configured uplink resources (PUR) for subsequent transmission in the small data transmission. The UE 10 may perform the subsequent data transmission by transmitting a second data payload of the small data transmission in a subsequent PDU on the configured uplink resources in the RRC inactive state.

Step 18D: The UE 10 reports DL HARQ feedback to the gNB 20. The DL HARQ feedback is for acknowledging the Msg4 RRCRelease message.

Step 19D: The UE 10 transmits the subsequent UL data with an AS RAI sub-header which may be configured to inform the subsequent UL data transmission. The subsequent UL data may be transmitted in a UL PDU.

Step 20D: If the gNB 20 cannot successfully receive the UL data, the gNB 20 reports DCI with CS-RNTI and NDI=0.

Step 21 D: The UE 10 re-transmits the UL data with an AS RAI sub-header.

Step 22D: If the gNB 20 successfully receives the UL data, the UL data is delivered to the UPF.

Step 23D: Similar to step 19D except that the AS RAI index is configured to inform that there is no further subsequent data transmission in the SDT.

Step 24D: Similar to step 9D.

Note that the UE 10 remains in RRC inactive state because the UL SDT can be completed in the following PUR.

Embodiment 3

Figure 8:
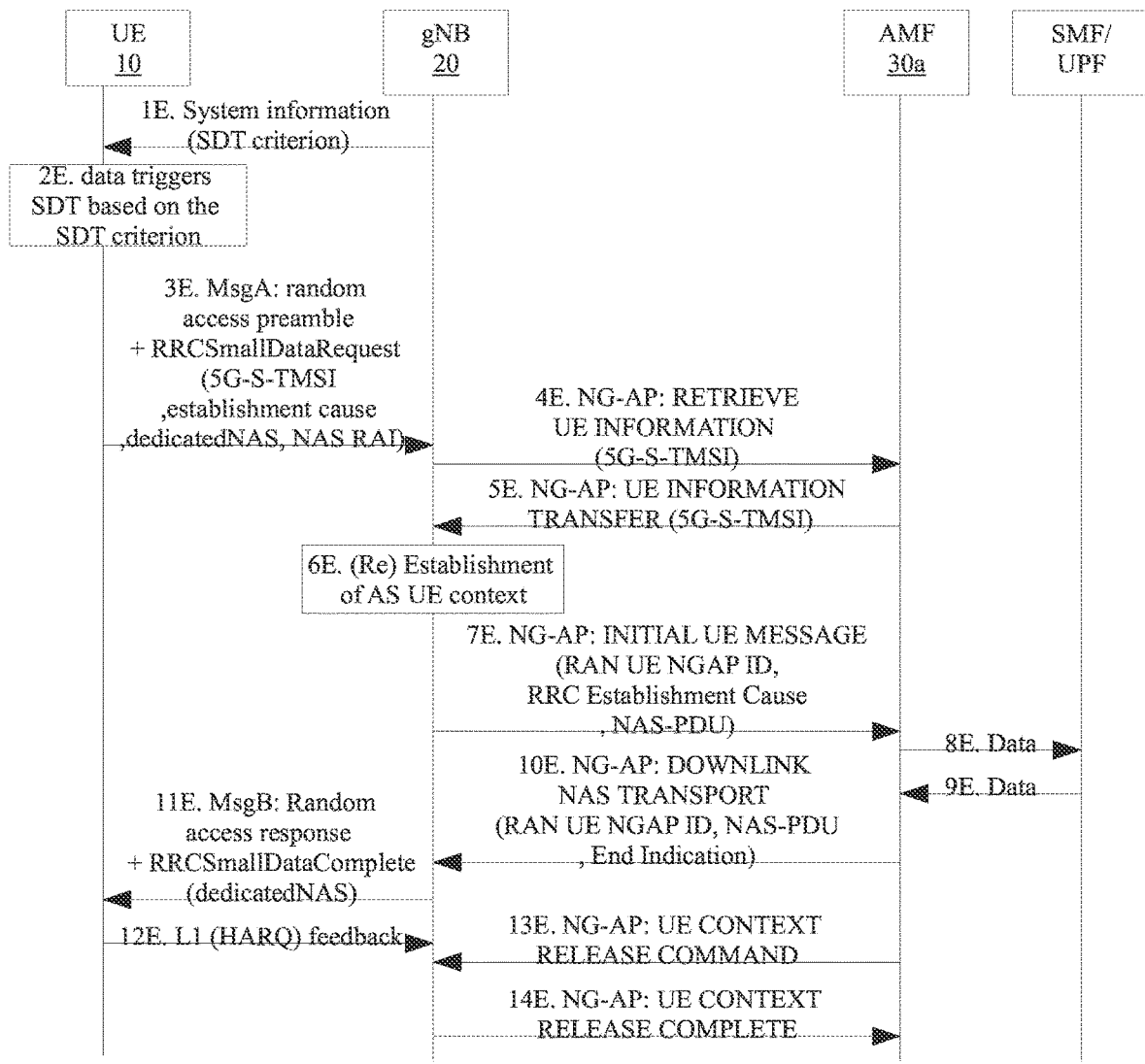
FIG. 8 illustrates a schematic view showing control plane small data transmission for only one PDU by 2-step RACH.

In this embodiment, UL data which can be encrypted in one NAS PDU is transmitted with MsgA. The SDT PRACH resource configuration comprises one of 2-step SDT PRACH resource configuration or 4-step SDT PRACH resource configuration. The 2-step SDT PRACH resource configuration is differentiated from the 4-step SDT PRACH resource configuration for determination as to whether the UE supports a 2-step SDT procedure or a 4-step SDT procedure. The detailed procedure of an embodiment of the disclosed method is depicted in FIG. 8. The UE 10 is in the RRC idle state from step 1 E to step 14E.

Step 1 E: The gNB 20 broadcasts the SDT criterion in system information, such as a system information block (SIB).

Step 2E: The UE receives the broadcast system information, such as the SIB, indicating the SDT criterion. The UE 10 triggers a control plane SDT procedure based on the SDT criterion.

Step 3E: The UE 10 transmits MsgA which comprises random access preamble and RRCSmallDataRequest message to the gNB 20. The 2-step SDT PRACH resource configuration may be separated from 4-step SDT PRACH resource configuration, such that the gNB 20 can determine whether the UE 10 can perform 2-step SDT or 4-step SDT procedure after receiving MsgA. The SDT PRACH resource may comprise new preamble sequence, new radio resource, new BWP, or maximum size for MsgA with UL data. The RRCSmallDataRequest message has a NAS PDU (DedicatedNAS-Message) that contains UL Data. The RRCSmallDataRequest message includes 5G-S-TMSI serving as the UE identity of the UE 10. The establishment cause may be configured as mobile originated (MO) SDT. The NAS RAI is a 2-bit information. When NAS RAI=01 is included in the NAS PDU, there is no further Uplink and DL data transmissions are expected. When NAS RAI=10 is included in the NAS PDU, there is only a single DL data transmission and no further UL data transmission subsequent to the UL data transmission is expected.

Step 4E: The gNB 20 acquires UE capabilities of the UE 10 from AMF 30*a* by sending a message NG-AP: RETRIEVE UE INFORMATION. The NG-AP: RETRIEVE UE INFORMATION message includes 5G-S-TMSI serving as the UE identity of the UE 10.

Step 5E: The AMF 30*a* reports the UE capabilities and UE level QoS to the gNB 20 by sending a message NG-AP: UE INFORMATION TRANSFER. The NG-AP: UE INFORMATION TRANSFER message includes 5G-S-TMSI serving as the UE identity of the UE 10.

Step 6E: The NR Uu part of the UE context of the UE 10 is established or re-established by the gNB 20 at this point.

Step 7E: The gNB 20 transmits an NG-AP: INITIAL UE MESSAGE with a NAS PDU that contains a CONTROL PLANE SERVICE REQUEST including a 5GSM DATA TRANSPORT carrying the UL Data (e.g., the first data payload). The INITIAL UE MESSAGE may comprise a RAN UE NGAP ID (to establish N2 logical channel), RRC establishment cause (to notify AMF 30*a* that this is data transmission using SDT), etc.

Step 8E: The AMF 30*a* sends a PDU Session ID and the UL data to the SMF, and the SMF forwards the UL data to the UPF.

Step 9E: If DL data for the UE 10 is available, the UPF forwards the DL data to the SMF and the SMF forwards the DL data to the AMF 30*a*.

Step 10E: The AMF 30*a* transmits a message NG-AP: DOWNLINK NAS TRANSPORT with a NAS PDU carrying the DL data. The DOWNLINK NAS TRANSPORT message may comprise a RAN UE NGAP ID (to identify N2 logical channel) and End indication to notify the gNB 20 that there is no further DL data in the SDT.

Step 11E: The gNB 20 transmits MsgB which comprises a random access response and an RRCSmallDataComplete message to the UE 10. The RRCSmallDataComplete message may comprise UL NAS PDU confirmation for the UL Data and the NAS PDU (DedicatedNAS-Message) with the DL data. The RRC SDT complete message RRCSmallDataComplete indicates termination of the small data transmission and contains a downlink data payload (e.g., the DL data) which is carried in a non-access stratum (NAS) message for the UE 10.

Step 12E: The UE 10 reports DL HARQ feedback to the gNB 20. The DL HARQ feedback is for acknowledging the Msg4 RRCSmallDataComplete message.

Step 13E: The AMF 30*a* transmits an NG-AP: UE CONTEXT RELEASE COMMAND to release the N2 logical channel.

Step 14E: After successfully receiving the DL HARQ feedback, the gNB 20 releases UE context of the UE 10 and reports a message NG-AP: UE CONTEXT RELEASE COMPLETE to the AMF 30*a*.

Note that the UE 10 doesn't need to enter an RRC connected state if the SDT can be completed during the RACH procedure.

Embodiment 3a

Figure 9:
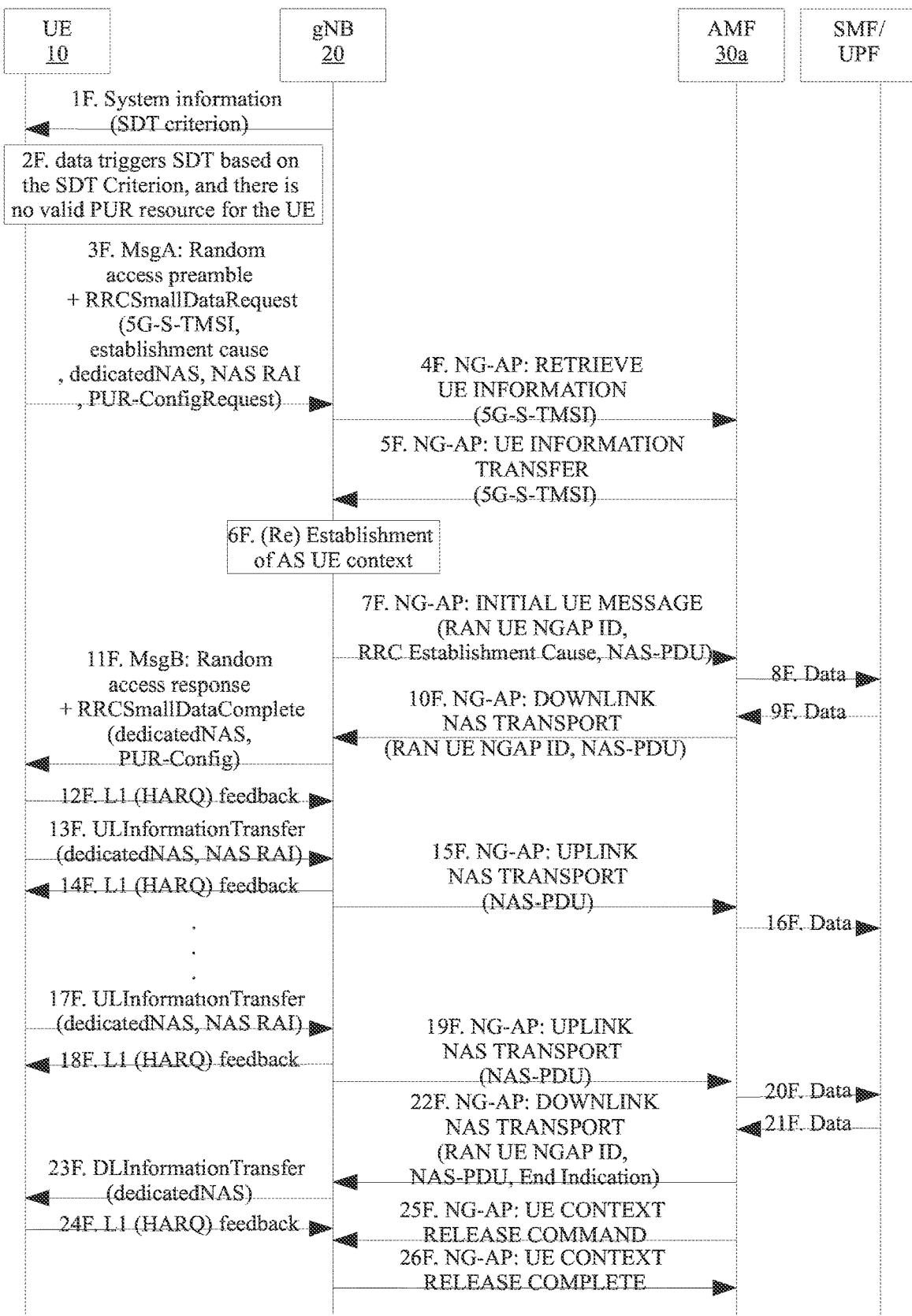
FIG. 9 illustrates a schematic view showing control plane small data transmission for multiple PDUs by 2-step RACH.

In this embodiment, a portion of UL data which can be encrypted in a NAS PDU is transmitted with MsgA, and the remaining portions of the UL data are transmitted in PUR. The detailed procedure of an embodiment of the disclosed method is depicted in FIG. 9. The UE 10 is in the RRC idle state from step 1F to step 26F.

Step 1F: The gNB 20 broadcasts the SDT criterion in system information, such as a system information block (SIB).

Step 2F: The UE receives the broadcast system information, such as the SIB, indicating the SDT criterion. The UE 10 triggers a control plane SDT procedure based on the SDT criterion. Currently, no valid PUR resource is configured for the UE 10.

Step 3F: The UE 10 transmits MsgA which comprises random access preamble and RRCSmallDataRequest message to the gNB 20. The RRCSmallDataRequest message has a NAS PDU (DedicatedNAS-Message) that contains UL Data. The RRCSmallDataRequest message includes 5G-S-TMSI serving as the UE identity of the UE 10. The establishment cause may be configured as MO SDT with subsequent data transmission. The NAS RAI and/or BSR in the message may be configured to inform the subsequent data transmission. For example, NAS RAI==11 may be configured to indicate that there is further UL data transmission subsequent to the UL data transmission and associated DL data transmission is expected. The RRCSmallDataRequest message may also comprise a PUR-ConfigRequest IE to request UL resources for transmitting the subsequent data transmission. The PUR-ConfigRequest IE may comprise a number of PUR occasions, periodicity of PUR occasions, or a TBS of PUR resources.

Step 4F: The gNB 20 acquires UE capabilities of the UE 10 from AMF 30a by sending a message NG-AP: RETRIEVE UE INFORMATION. The NG-AP: RETRIEVE UE INFORMATION message includes 5G-S-TMSI serving as the UE identity of the UE 10.

Step 5F: The AMF 30a reports the UE capabilities and UE level QoS to the gNB 20 by sending a message NG-AP: UE INFORMATION TRANSFER. The NG-AP: UE INFORMATION TRANSFER message includes 5G-S-TMSI serving as the UE identity of the UE 10.

Step 6F: The NR Uu part of the UE context of the UE 10 is established or re-established by the gNB 20 at this point.

Step 7F: The gNB 20 transmits an NG-AP: INITIAL UE MESSAGE with a NAS PDU that contains a CONTROL PLANE SERVICE REQUEST including a 5GSM DATA TRANSPORT carrying the UL Data (e.g., the first data payload). The INITIAL UE MESSAGE may comprise a RAN UE NGAP ID (to establish N2 logical channel), RRC establishment cause (to notify AMF 30a that this is data transmission using SDT), etc.

Step 8F: The AMF 30a sends a PDU Session ID and the UL data to the SMF, and the SMF forwards the UL data to the UPF.

Step 9F: If DL data for the UE 10 is available, the UPF forwards the DL data to the SMF and the SMF forwards the DL data to the AMF 30a.

Step 10F: The AMF 30a transmits a message NG-AP: DOWNLINK NAS TRANSPORT with a NAS PDU carrying the DL data. The DOWNLINK NAS TRANSPORT message may comprise a RAN UE NGAP ID (to identify N2 logical channel).

Step 11F: The gNB 20 transmits MsgB which comprises a random access response and an RRCSmallDataComplete message to the UE 10. The RRCSmallDataComplete message may comprise UL NAS PDU confirmation for the UL Data, the NAS PDU (DedicatedNAS-Message) with the DL data, and the PUR-Config IE. The PUR-Config IE includes PUR configuration to configure PUR resources for the subsequent data transmission in the SDT. The PUR-Config IE may comprise a time alignment timer, a time offset for the first PUR occasion, periodicity of the PUR, a number of PURs, a modulation index and a TBS index for PUR, etc. The RRCSmallDataComplete message in the MsgB serves as the contention resolution message that comprises configuration of configured uplink resources for subsequent transmission in the small data transmission. The RRC SDT complete message RRCSmallDataComplete indicates termination of the small data transmission and contains a downlink data payload (e.g., the DL data) which is carried in a non-access stratum (NAS) message for the UE 10. In the embodiment, the RRC SDT complete message RRCSmallDataComplete serves as the contention resolution message 202 in FIG. 2. In an embodiment, the configured uplink resources comprise configured grant (CG) resources for subsequent transmission in the small data transmission. In another embodiment, the configured uplink resources comprise pre-configured uplink resources (PUR) for subsequent transmission in the small data transmission. The UE 10 may perform the subsequent data transmission by transmitting a second data payload of the small data transmission in a subsequent PDU on the configured uplink resources in an RRC connected state.

Step 12F: After successfully receiving RRCSmallDataComplete message, the UE 10 starts the time alignment timer and reports DL HARQ feedback to the gNB 20. The DL HARQ feedback is for acknowledging the Msg4 RRCSmallDataComplete message. The UE 10 use the time alignment timer to locate the configured uplink resources for the subsequent data transmission in the SDT. Note that the time alignment timer is re-started after receiving L1 HARQ feedback from the gNB 20.

Step 13F: The UE 10 transmits an ULInformationTransfer message with a NAS PDU (DedicatedNAS-Message) that contains subsequent UL Data (e.g., a remaining portion of uplink data payload in the SDT). The NAS RAI in the message may be configured to inform the subsequent data transmission.

Step 14F: The gNB 20 may report UL HARQ feedback to the UE 10. The UL HARQ feedback is for acknowledging the ULInformationTransfer message in step 13F.

Step 15F: The gNB 20 transmits an NG-AP: UPLINK NAS TRANSPORT message with a NAS PDU carrying the subsequent UL Data (e.g., a remaining portion of uplink data payload in the SDT).

Step 16F: Similar to step 8F.

Step 17F: Similar to step 13F except that the NAS RAI is configured to inform that there is no further subsequent data transmission in the SDT.

Step 18F: Similar to step 14F, the gNB 20 may report UL HARQ combination feedback for acknowledging multiple ULInformationTransfer messages.

Step 19F: Similar to step 15F.

Step 20F: Similar to step 8F.

Step 21F: Similar to step 9F.

Step 22F: Similar to step 10F except that the DOWNLINK NAS TRANSPORT message comprises End indication to notify the gNB 20 that there is no further DL data in the SDT.

Step 23F: The gNB 20 transmits a DLInformationTransfer message to the UE 10. The DLInformationTransfer message comprises the NAS PDU (DedicatedNAS-Message) with the DL data.

Step 24F: The UE 10 reports DL HARQ feedback to the gNB 20. The DL HARQ feedback is for acknowledging the DLInformationTransfer message.

Step 25F: The AMF 30a transmits an NG-AP: UE CONTEXT RELEASE COMMAND to release the N2 logical channel.

Step 26F: After successfully receiving the DL HARQ feedback, the gNB 20 releases UE context of the UE 10 and reports a message NG-AP: UE CONTEXT RELEASE COMPLETE to the AMF 30a.

Note that the UE 10 doesn't need to enter an RRC connected state if the SDT with multiple PDUs can be completed during the RACH procedure.

Embodiment 4

Figure 10:
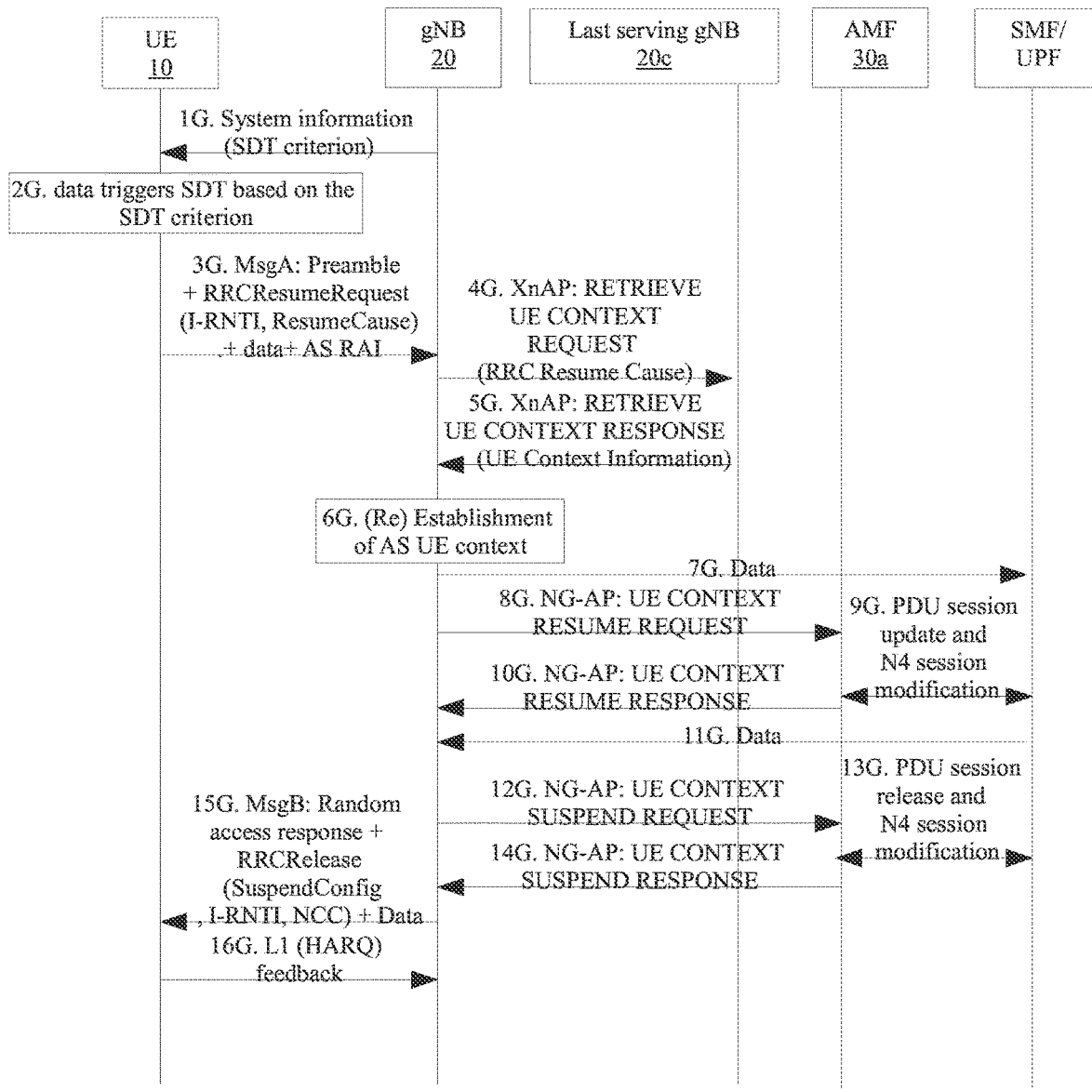
FIG. 10 illustrates a schematic view showing user plane small data transmission for multiple PDUs by 2-step RACH.

In this embodiment, UL data which is multiplexed with MsgA (i.e. RRCResumeRequest) and corresponding DL data is multiplexed with MsgB (i.e. RRCRelease). The detailed procedure of an embodiment of the disclosed method is depicted in FIG. 10. The UE 10 is in the RRC inactive state from step 1G to step 16G.

Step 1G: The gNB 20 broadcasts the SDT criterion in system information, such as a system information block (SIB).

Step 2G: The UE receives the broadcast system information, such as the SIB, indicating the SDT criterion. The UE 10 triggers a user plane SDT procedure based on the SDT criterion.

Step 3G: The UE 10 transmits MsgA which comprises random access preamble and RRCResumeRequest message to the gNB 20. The RRCResumeRequest message includes I-RNTI, the resume cause, and an authentication token of the UE 10. The UE 10 resumes all SRBs and DRBs, derives new security keys using the NCC provided in the RRCRelease message of the previous connection and re-establishes the AS security. User data of the UE 10 including UL data is ciphered and transmitted on DTCH multiplexed with the RRCResumeRequest message on CCCH. The RRCResumeRequest message includes UL data as the first data payload from the UE 10 for the SDT. The UE 10 also transmits AS RAI in the message to indicate no further UL data and only one associated DL data.

Step 4G: The gNB 20, if being able to resolve the gNB identity contained in the I-RNTI, transmits an XnAP: RETRIEVE UE CONTEXT REQUEST message to request the last serving gNB 20*c* to provide UE Context of the UE 10.

Step 5G: The last serving gNB 20*c* transmits an XnAP: RETRIEVE UE CONTEXT RESPONSE message to provide UE context of the UE 10 data.

Step 6G: The NR Uu part of the UE context of the UE 10 is established or re-established by the gNB 20 at this point.

Step 7G: The UL data is delivered to the UPF.

Step 8G: The gNB 20 transmits an NG-AP: UE CONTEXT RESUME REQUEST message to the AMF 30*a* to resume the connection. Because the AS RAI indicates no further UL data and one more DL data, the gNB 20 also transmits a Suspend Request Indication to request for immediate transition to RRC Inactive with Suspend.

Step 9G: The AMF 30*a* is aware of DL data, and the AMF 30*a* requests the SMF to resume a PDU session.

Step 10G: The AMF 30*a* transmits an NG-AP: UE CONTEXT RESUME RESPONSE message to the gNB 20.

Step 11G: Because the UE 10 includes the AS RAI indicating only a single DL data transmission subsequent to the UL data transmission, the gNB 20 waits for the DL data to arrive.

Step 12G: The gNB 20 transmits the NG-AP: UE CONTEXT SUSPEND REQUEST message to inform AMF 30*a* that the RRC connection is being suspended.

Step 13G: The AMF 30*a* requests the SMF to suspend the PDU session, and the SMF requests the UPF to release tunnel information for the UE 10.

Step 14G: The AMF 30*a* transmits an NG-AP: UE CONTEXT SUSPEND RESPONSE message to the gNB 20.

Step 15G: The gNB 20 sends the MsgB which comprises random access response and RRCRelease message to keep the UE 10 in RRC Inactive. The RRCRelease message may include SuspendConfig, the I-RNTI, the NCC stored in the UE 10. The DL data is sent ciphered on DTCH multiplexed with the RRCRelease message on DCCH. The RRC release message RRCRelease responds to the PRACH uplink message (i.e., the RRCResumeRequest message in MsgA) and keeps the UE 10 stay at an RRC inactive state.

Step 16G: The UE 10 reports DL HARQ feedback to the gNB 20. The DL HARQ feedback is for acknowledging the MsgB message.

Note that the UE 10 remains in RRC inactive state if the SDT can be completed during the RACH procedure.

Embodiment 4a

Figure 11:
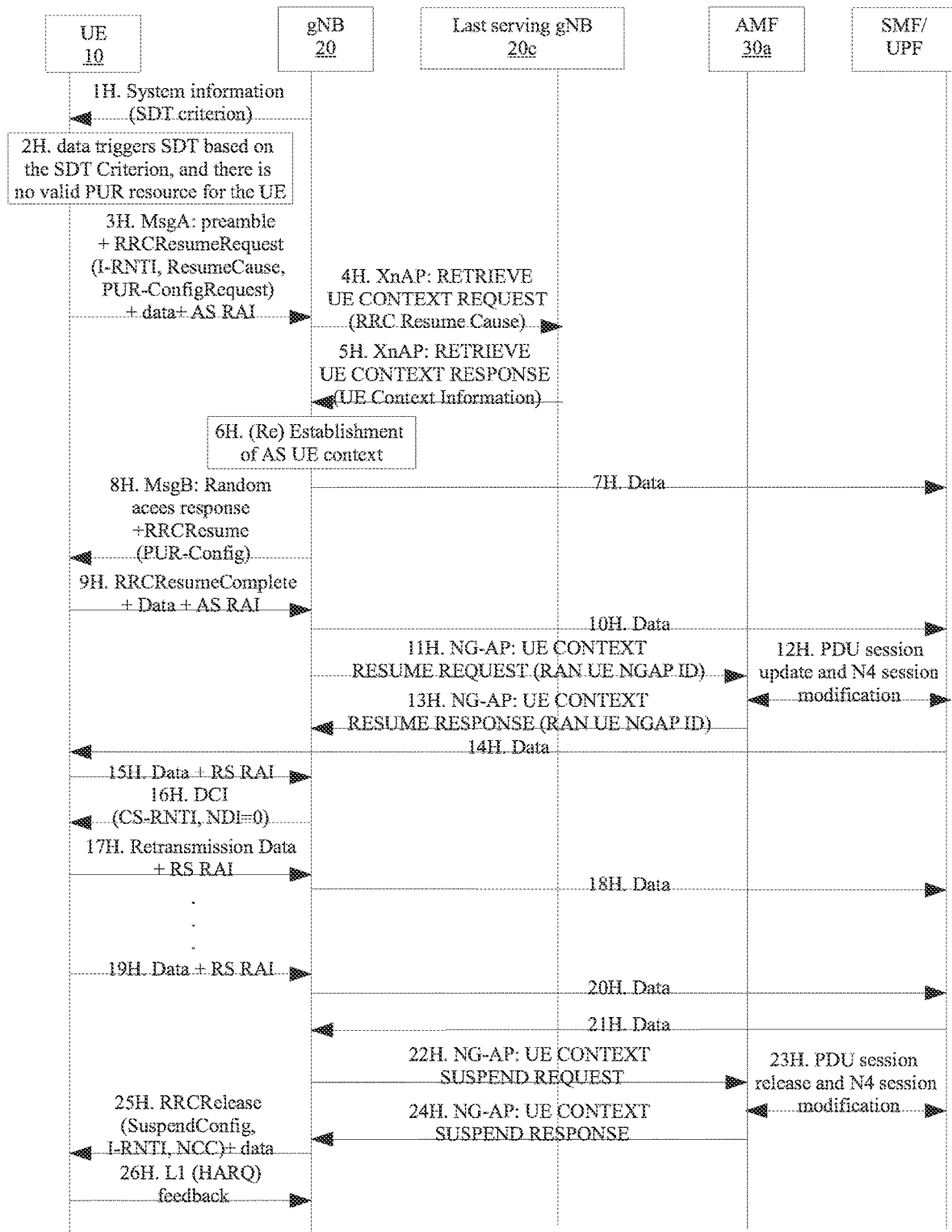
FIG. 11 illustrates a schematic view showing user plane small data transmission for multiple PDUs by 2-step RACH where a UE enters RRC connected to transmit subsequent data.

In this embodiment, a portion of UL data is multiplexed with MsgA (i.e. RRCResume message), and the remaining portions of the UL data are transmitted in PUR. The detailed procedure of an embodiment of the disclosed method is depicted in FIG. 11. The UE 10 is in the RRC inactive state from step 1H to step 8H. The UE 10 is in the RRC connected state from step 9H to step 25HC. The UE 10 returns to the RRC inactive state in step 26H.

Step 1 H: The gNB 20 broadcasts the SDT criterion in system information, such as a system information block (SIB).

Step 2H: The UE receives the broadcast system information, such as the SIB, indicating the SDT criterion. The UE 10 triggers a control plane SDT procedure based on the SDT criterion. Currently, no valid PUR resource is configured for the UE 10.

Step 3H: The UE 10 transmits MsgA which comprises random access preamble and RRCResumeRequest message to the gNB 20. The RRCResumeRequest message includes I-RNTI, the resume cause, and an authentication token of the UE 10. The UE 10 resumes all SRBs and DRBs, derives new security keys using the NCC provided in the RRCRelease message of the previous connection and re-establishes the AS security. User data of the UE 10 including UL data is ciphered and transmitted on DTCH multiplexed with the RRCResumeRequest message on CCCH. The RRCResumeRequest message includes UL data as the first data payload from the UE 10 for the SDT. The UE 10 also transmits AS RAI and/or BSR in the RRCResumeRequest message to indicate the subsequent data transmission. For example, AS RAI index may be configured as 11 to indicate that there is further UL data transmission subsequent to the UL data transmission and associated DL data transmission is expected. RRCResumeRequest message may also comprise a PUR-ConfigRequest IE to request UL resources for transmitting the subsequent data transmission. The PUR-ConfigRequest IE may comprise a number of PUR occasions, periodicity of PUR occasions, or a TBS of PUR resources.

Step 4H: The gNB 20, if being able to resolve the gNB identity contained in the I-RNTI, transmits an XnAP: RETRIEVE UE CONTEXT REQUEST message to request the last serving gNB 20*c* to provide UE Context of the UE 10.

Step 5H: The last serving gNB 20*c* transmits an XnAP: RETRIEVE UE CONTEXT RESPONSE message to provide UE context of the UE 10 data.

Step 6H: The NR Uu part of the UE context of the UE 10 is established or re-established by the gNB 20 at this point.

Step 7H: The UL data is delivered to the UPF.

Step 8H: The gNB 20 transmits MsgB which comprises random access response and RRCResume message to the UE 10. The RRCResume message comprises the PUR-Config IE to configure PUR resources for the subsequent data transmission in the SDT. The PUR-Config IE may comprise a time alignment timer, a time offset for the first PUR occasion, periodicity of the PUR, a number of PURs, a modulation index and a TBS index for PUR, etc. The RRCResume message in MsgB serves as the contention resolution message that comprises configuration of configured uplink resources for subsequent transmission in the small data transmission. The RRC resume message RRCResume responds to the PRACH uplink message (i.e., RRCResumeRequest message in MsgA) and triggers the UE 10 to transit to the RRC connected state. The RRC resume message RRCResume contains a downlink data payload (e.g., the DL data) for the UE 10. In the embodiment, the RRC resume message RRCResume serves as the contention resolution message 202 in FIG. 2. In an embodiment, the configured uplink resources comprise configured grant (CG) resources for subsequent transmission in the small data transmission. In another embodiment, the configured uplink resources comprise pre-configured uplink resources (PUR) for subsequent transmission in the small data transmission. The UE 10 may perform the subsequent data transmission by transmitting a second data payload of the small data transmission in a subsequent PDU on the configured uplink resources in an RRC connected state.

Step 9H: The UE 10 transmits RRCResumeComplete message to the gNB 20. The RRCResumeComplete message is for acknowledging the MsgB message, and the RRCResumeComplete message may be also multiplexed with subsequent UL data and AS RAI sub-header. After transmitting RRCResumeComplete message, the UE 10 enters RRC connected state. The RRCResumeComplete message may be transmitted in a UL PDU to include the subsequent UL data of the UE 10 in the SDT.

Step 10H: if there is UL data transmitted in step 9, the UL data is delivered to the UPF.

Step 11H: The gNB 20 transmits an NG-AP: UE CONTEXT RESUME REQUEST message to the AMF 30a to resume the connection. Because the AS RAI indicates further UL data transmission subsequent to the UL data transmission and associated DL data transmission is expected, the gNB 20 does not transmit Suspend Request Indication to request for immediate transition to RRC Inactive with Suspend. Note that the periodicity of the PUR may be a value ranging from several 10 ms to several seconds.

Step 12H: The AMF 30a is aware of DL data, and the AMF 30a requests the SMF to resume a PDU session.

Step 13H: The AMF 30a transmits an NG-AP: UE CONTEXT RESUME RESPONSE message to the gNB 20.

Step 14H: The DL data are delivered from the UPF to the UE 10.

Step 15H: The UE 10 transmits UL data with AS RAI sub-header which may be configured to inform the subsequent data transmission. The UL data may be transmitted in an UL PDU to the gNB 20.

Step 16H: If the gNB 20 cannot successfully receive the UL data, the gNB 20 reports DCI with CS-RNTI and NDI=0. NDI stands for new data indication.

Step 17H: The UE 10 re-transmits the UL data with AS RAI sub-header.

Step 18H: If the gNB 20 successfully receives the UL data, the UL data is delivered to the UPF.

Step 19H: Similar to step 15H except that the AS RAI index is configured to inform that there is no further subsequent data transmission in the SDT.

Step 20H: Similar to step 10H.

Step 21H: The DL data are delivered from the UPF to the gNB 20.

Step 22H: The gNB 20 transmits the NG-AP: UE CONTEXT SUSPEND REQUEST message to inform AMF 30a that the RRC connection is suspended.

Step 23H: The AMF 30a requests the SMF to suspend the PDU session, and the SMF requests the UPF to release tunnel information for the UE 10.

Step 24H: The AMF 30a transmits an NG-AP: UE CONTEXT SUSPEND RESPONSE message to the gNB 20.

Step 25H: The gNB 20 sends the RRCRelease message to release the UE connection. The RRCRelease message may include SuspendConfig, the I-RNTI, the NCC stored in the UE 10, and the DL data. The DL data is sent ciphered on DTCH multiplexed with the RRCRelease message on DCCH.

Step 26H: The UE 10 reports DL HARQ feedback to the gNB 20. The DL HARQ feedback is for acknowledging the RRCRelease message. After transmitting DL HARQ feedback, the UE 10 enters into RRC inactive state.

Note that the UE 10 needs to enter an RRC connected state because SDT with multiple PDUs cannot be completed during the RACH procedure.

Embodiment 4b

Figure 12:
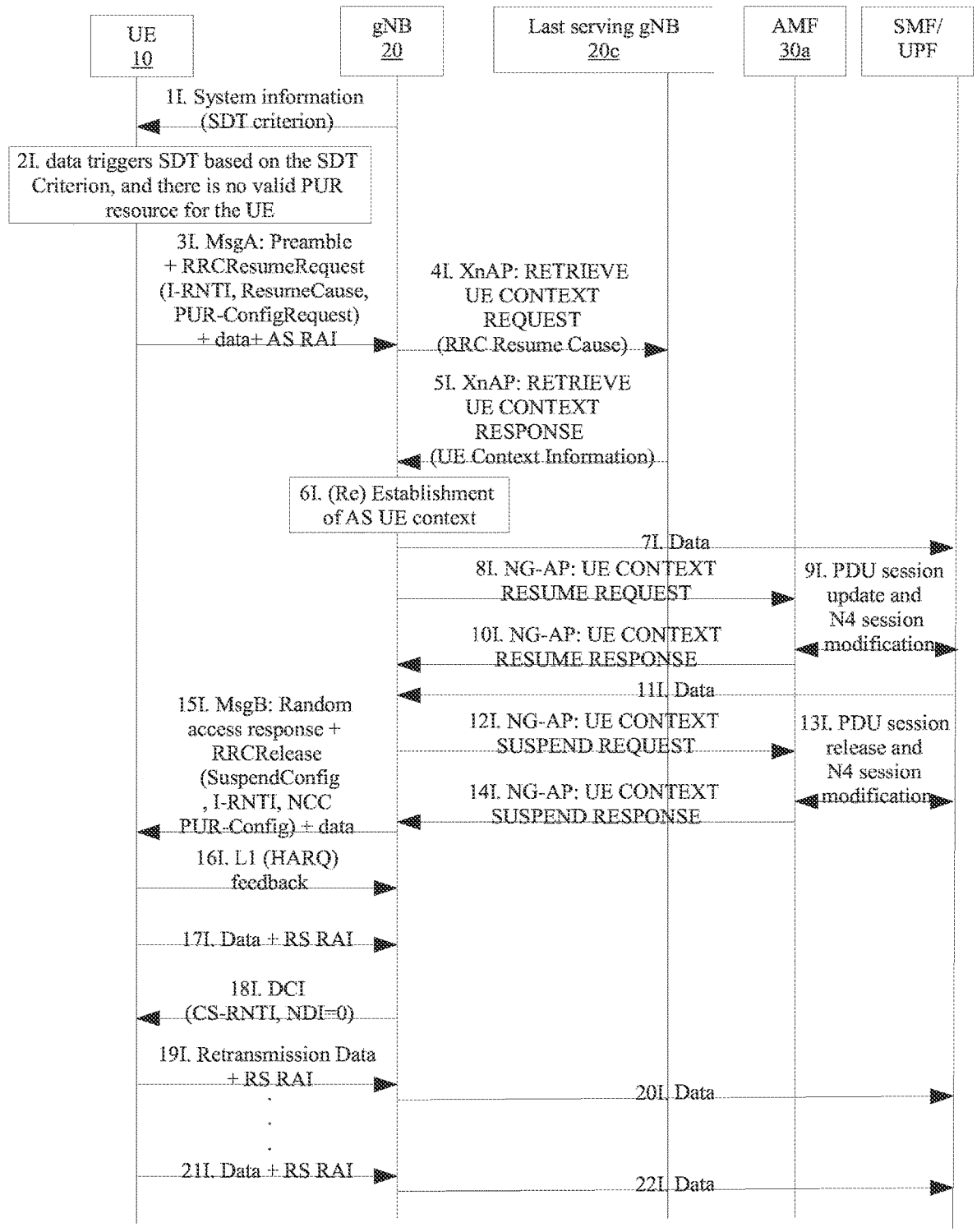
FIG. 12 illustrates a schematic view showing user plane small data transmission for multiple PDUs by 2-step RACH where a UE remains in RRC inactive to transmit subsequent data.

In this embodiment, a portion of UL data is multiplexed with MsgA (i.e. RRCResumeRequest) and corresponding DL data is multiplexed with MsgB. (i.e. RRCRelease), and the UE 10 stays in RRC inactive state to transmit the remaining portions of the UL data in PUR. The detailed procedure of an embodiment of the disclosed method is depicted in FIG. 12. The UE 10 is in the RRC inactive state from step 1I to step 22I.

Step 1I: The gNB 20 broadcasts the SDT criterion in system information, such as a system information block (SIB).

Step 2I: The UE receives the broadcast system information, such as the SIB, indicating the SDT criterion. The UE 10 triggers a user plane SDT procedure based on the SDT criterion. Currently, no valid PUR resource is configured for the UE 10.

Step 3I: The UE 10 transmits MsgA which comprises random access preamble and RRCResumeRequest message to the gNB 20. The RRCResumeRequest message includes I-RNTI, the resume cause, and an authentication token of the UE 10. The UE resumes all SRBs and DRBs, derives new security keys using the NCC provided in the RRCRelease message of the previous connection and re-establishes the AS security. User data of the UE 10 including UL data is ciphered and transmitted on DTCH multiplexed with the RRCResumeRequest message on CCCH. The RRCResumeRequest message includes UL data as the first data payload from the UE 10 for the SDT. The AS RAI index in the message may be configured to indicate that there is further UL data transmission subsequent to the UL data transmission and "no" associated DL data transmission is expected. The RRCResumeRequest message may also comprise a PUR-ConfigRequest IE to request UL resources for transmitting the subsequent UL data transmission.

Step 4I: The gNB 20, if being able to resolve the gNB identity contained in the I-RNTI, transmits an XnAP:

RETRIEVE UE CONTEXT REQUEST message to request the last serving gNB 20c to provide UE Context of the UE 10.

Step 5I: The last serving gNB 20c transmits an XnAP: RETRIEVE UE CONTEXT RESPONSE message to provide UE context of the UE 10 data.

Step 6I: The NR Uu part of the UE context of the UE 10 is established or re-established by the gNB 20 at this point.

Step 7I: The UL data is delivered to the UPF.

Step 8I: The gNB 20 transmits an NG-AP: UE CONTEXT RESUME REQUEST message to the AMF 30a to resume the connection. Because the AS RAI indicates no further UL data and one more DL data, the gNB 20 also transmits a Suspend Request Indication to request for immediate transition to RRC Inactive with Suspend.

Step 9I: The AMF 30a is aware of DL data, and the AMF 30a requests the SMF to resume a PDU session.

Step 10I: The AMF 30a transmits an NG-AP: UE CONTEXT RESUME RESPONSE message to the gNB 20.

Step 11I: Because the UE 10 includes the AS RAI indicating only a single DL data transmission subsequent to the UL data transmission, the gNB 20 waits for the DL data to arrive.

Step 12I: The gNB 20 transmits the NG-AP: UE CONTEXT SUSPEND REQUEST message to inform AMF 30a that the RRC connection is suspended.

Step 13I: The AMF 30a requests the SMF to suspend the PDU session, and the SMF requests the UPF to release tunnel information for the UE 10.

Step 14I: The AMF 30a transmits an NG-AP: UE CONTEXT SUSPEND RESPONSE message to the gNB 20.

Step 15I: The gNB 20 sends the MsgB which comprises random access response and RRCRelease message to keep the UE 10 in RRC Inactive. The RRCRelease message may include SuspendConfig, the I-RNTI, the NCC stored in the UE 10, and the PUR-Config IE. The PUR-Config IE comprises a configuration that configures PUR resources for the subsequent UL data transmission in the SDT. The DL data is sent ciphered on DTCH multiplexed with the RRCRelease message on DCCH. The RRCRelease message in MsgB serves as the contention resolution message that comprises configuration of configured uplink resources for subsequent transmission in the small data transmission. The RRC release message RRCRelease responds to the PRACH uplink message (i.e., the RRCResumeRequest message in MsgA) and keeps the UE 10 stay at an RRC inactive state. The RRC release message contains a downlink data payload for the UE 10. In the embodiment, the RRC release message RRCRelease serves as the contention resolution message 202 in FIG. 2. In an embodiment, the configured uplink resources comprise configured grant (CG) resources for subsequent transmission in the small data transmission. In another embodiment, the configured uplink resources comprise pre-configured uplink resources (PUR) for subsequent transmission in the small data transmission. The UE 10 may perform the subsequent data transmission by transmitting a second data payload of the small data transmission in a subsequent PDU on the configured uplink resources in an RRC inactive state.

Step 16I: The UE 10 reports DL HARQ feedback to the gNB 20. The DL HARQ feedback is for acknowledging the MsgB message.

Step 17I: The UE 10 transmits subsequent UL data with an AS RAI sub-header which may be configured to inform the subsequent UL data transmission. The subsequent UL data of the UE 10 in the SDT may be transmitted in a UL PDU.

Step 18I: If the gNB 20 cannot successfully receive the UL data, the gNB 20 reports DCI with CS-RNTI and NDI=0.

Step 19I: The UE 10 re-transmits the UL data with an AS RAI sub-header.

Step 20I: If the gNB 20 successfully receives the UL data, the UL data is delivered to the UPF.

Step 21I: Similar to step 17I except that the AS RAI index is configured to inform that there is no further subsequent data transmission in the SDT.

Step 22I: Similar to step 7I.

Note that the UE 10 remains in RRC inactive state because the UL SDT can be completed in the following PUR.

Figure 13:
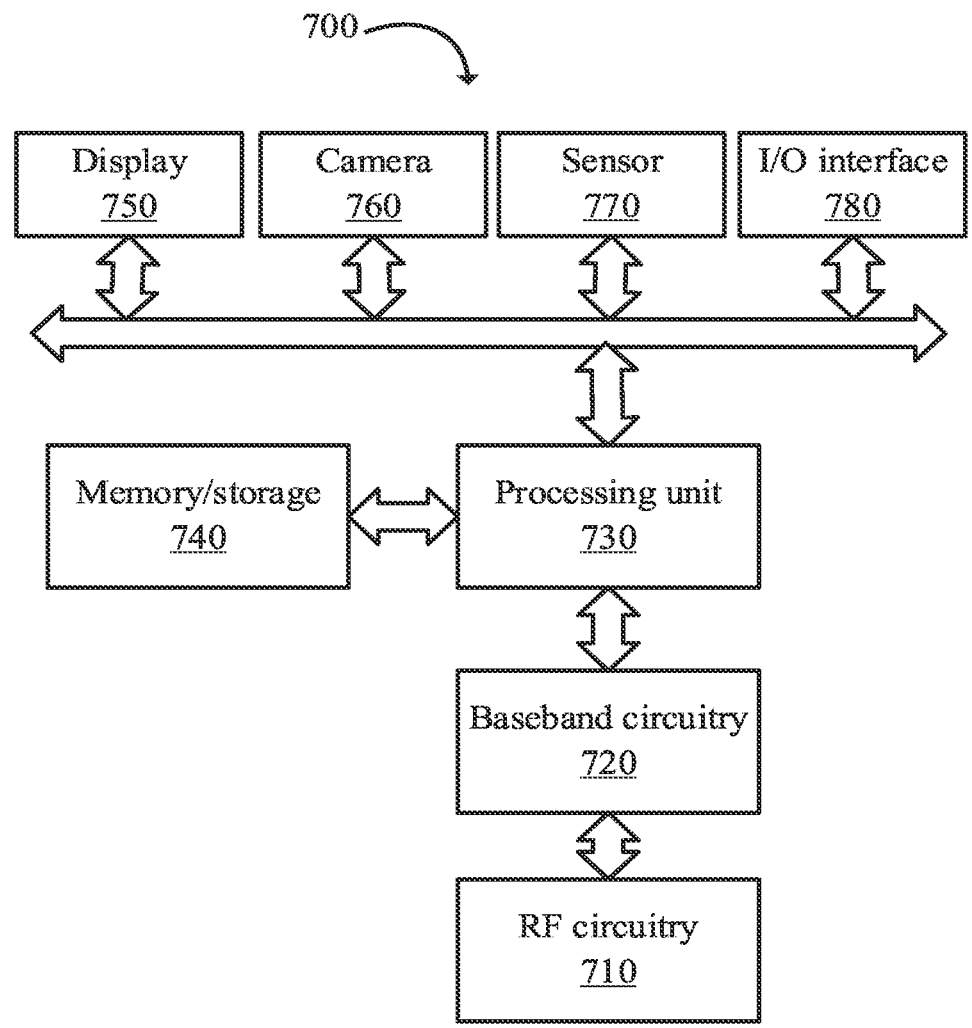
FIG. 13 illustrates a schematic view showing a system for wireless communication according to an embodiment of the present disclosure.

FIG. 13 is a block diagram of an example system 700 for wireless communication according to an embodiment of the present disclosure. Embodiments described herein may be implemented into the system using any suitably configured hardware and/or software. FIG. 13 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for the system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an Ultrabook, a smartphone, etc. In various embodiments, the system may have more or less components, and/or different architectures. Where appropriate, the methods described herein may be implemented as a computer program. The computer program may be stored on a storage medium, such as a non-transitory storage medium.

The embodiment of the present disclosure is a combination of techniques/processes that may be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of the application and design requirement for a technical plan. A person having ordinary skill in the art may use different ways to realize the function for each specific application while such realizations should not go beyond the scope of the present disclosure. It is understood by a person having ordinary skill in the art that he/she may refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure may be realized in other ways. The above-mentioned embodiments are exemplary only. The division of the units is merely based on logical functions while other divisions exist in realization. It is possible that a plurality of units or components are combined or integrated into another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments may be integrated into one processing unit, physically independent, or integrated into one processing unit with two or more than two units.

If the software function unit is realized and used and sold as a product, it may be stored in a readable storage medium in a computer. Based on this understanding, the technical plan proposed by the present disclosure may be essentially or partially realized as the form of a software product. Or, one part of the technical plan beneficial to the conventional technology may be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

The disclosed method improves small data transmission by providing 4-step and 2-step RACH for SDT with only one PDU or multiple PDUs. In the disclosed method, a UE obtains small data transmission (SDT) physical random access channel (PRACH) resource configuration for small data transmission. The SDT PRACH resource configuration comprises at least one of a first random access preamble or a first set of radio resources for transmission of the first random access preamble and is differentiated from non-SDT PRACH resource configuration. The UE initiates a random access procedure by transmitting the first random access preamble on the first set of radio resources for the SDT. The small data transmission includes transmission of a first data payload in a PRACH uplink message of the random access procedure.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A small data transmission method executable in a user equipment (UE), comprising:
obtaining small data transmission (SDT) physical random access channel (PRACH) resource configuration for small data transmission, wherein the SDT PRACH resource configuration comprises at least one of a first random access preamble or a first set of radio resources for transmission of the first random access preamble and is differentiated from non-SDT PRACH resource configuration;
initiating a random access procedure by transmitting the first random access preamble on the first set of radio resources for the small data transmission (SDT), wherein the small data transmission includes transmission of a first data payload in a PRACH uplink message of the random access procedure, and the UE transmits an indication to indicate a request for a subsequent data transmission; and
receiving a contention resolution message of the random access procedure, wherein the contention resolution message comprises a signaling regarding the small data transmission, the contention resolution message comprises configuration of configured uplink resources for subsequent transmission of the small data transmission, and the configured uplink resources comprise configured grant (CG) resources for subsequent transmission of the small data transmission.

2. The method of claim 1, wherein the SDT PRACH resource configuration further comprises at least one of bandwidth part (BWP) for the SDT or a maximum size of Msg3 for the SDT.

3. The method of claim 1, wherein the SDT PRACH resource configuration comprises one of 2-step SDT PRACH resource configuration or 4-step SDT PRACH resource configuration, and the 2-step SDT PRACH resource configuration is differentiated from the 4-step SDT PRACH resource configuration for determination as to whether the UE supports a 2-step SDT procedure or a 4-step SDT procedure.

4. The method of claim 1, wherein the UE receives a broadcast system information block (SIB) indicating an SDT criterion.

5. The method of claim 1, wherein the PRACH uplink message comprises MSG3 in a 4-step random access procedure, and the contention resolution message comprises a MSG4 in a 4-step random access procedure.

6. The method of claim 5, wherein a data size associated with the subsequent data transmission of the small data transmission requires more protocol data units (PDUs).

7. The method of claim 6, wherein the contention resolution message comprises configuration of configured uplink resources for subsequent transmission of the small data transmission;
wherein the configured uplink resources comprise configured grant (CG) resources for subsequent transmission of the small data transmission or pre-configured uplink resources (PUR) for subsequent transmission of the small data transmission;
wherein the UE performs the subsequent data transmission by transmitting a second data payload of the small data transmission in a subsequent PDU on the configured uplink resources in an RRC inactive state;
wherein the contention resolution message is an RRC release message RRCRelease, and the RRC release message RRCRelease responds to the PRACH uplink message and keeps the UE stay at an RRC inactive state;
wherein the RRC release message contains a first downlink data payload for the UE.

8. The method of claim 6, wherein the contention resolution message comprises configuration of configured uplink resources for subsequent transmission of the small data transmission;
wherein the configured uplink resources comprise configured grant (CG) resources for subsequent transmission of the small data transmission or pre-configured uplink resources (PUR) for subsequent transmission of the small data transmission;
wherein the UE performs the subsequent data transmission by transmitting a second data payload of the small data transmission in a subsequent PDU on the configured uplink resources in an RRC inactive state;
wherein the UE use a timer to locate the configured uplink resources for the subsequent data transmission in the SDT.

9. The method of claim 6, wherein the contention resolution message comprises configuration of configured uplink resources for subsequent transmission of the small data transmission;
wherein the contention resolution message is an RRC SDT complete message RRCSmallDataComplete which comprises the configuration of the configured uplink resources for the subsequent transmission of the small data transmission.

10. The method of claim 1, wherein the PRACH uplink message is included in MSGA in a 2-step random access procedure, and the contention resolution message is included in a MSGB in a 2-step random access procedure.

11. The method of claim 1, wherein the configured uplink resources comprises pre-configured uplink resources (PUR) for subsequent transmission of the small data transmission.

12. The method of claim 11, wherein the UE performs the subsequent data transmission by transmitting a second data payload of the small data transmission in a subsequent PDU on the configured uplink resources in an RRC connected state.

13. The method of claim 12, wherein the contention resolution message is a radio resource control (RRC) resume message RRCResume, and the RRC resume message RRCResume responds to the PRACH uplink message and triggers the UE to transit to an RRC connected state.

14. The method of claim 13, wherein the RRC resume message RRCResume contains a first downlink data payload for the UE.

15. The method of claim 11, wherein the UE performs the subsequent data transmission by transmitting a second data payload of the small data transmission in a subsequent PDU on the configured uplink resources in an RRC inactive state.

16. The method of claim 15, wherein the contention resolution message is an RRC release message RRCRelease, and the RRC release message RRCRelease responds to the PRACH uplink message and keeps the UE stay at an RRC inactive state.

17. A small data transmission method executable in a base station, comprising:
receiving a first random access preamble on a first set of radio resources for small data transmission (SDT) in a random access procedure, wherein the small data transmission includes transmission of a first data payload in a PRACH uplink message of the random access procedure, the base station receives an indication that indicates a request for a subsequent data transmission, and an SDT physical random access channel (PRACH) resource configuration comprises at least one of the first random access preamble or the first set of radio resources for transmission of the first random access preamble and is differentiated from non-SDT PRACH resource configuration; and transmitting a contention resolution message in the random access procedure in response to the first random access preamble, wherein the contention resolution message comprises a signaling regarding the small data transmission, the contention resolution message comprises configuration of configured uplink resources for subsequent transmission of the small data transmission, and the configured uplink resources comprise configured grant (CG) resources for subsequent transmission of the small data transmission.

18. The method of claim 17, wherein the SDT PRACH resource configuration further comprises at least one of bandwidth part (BWP) for the SDT or a maximum size of Msg3 for the SDT.

19. The method of claim 17, wherein the SDT PRACH resource configuration comprises one of 2-step SDT PRACH resource configuration or 4-step SDT PRACH resource configuration, and the 2-step SDT PRACH resource configuration is differentiated from the 4-step SDT PRACH resource configuration for determination as to whether a UE supports a 2-step SDT procedure or a 4-step SDT procedure.

20. The method of claim 17, wherein the base station broadcasts a system information block (SIB) indicating an SDT criterion.

21. The method of claim 17, wherein the base station determines that the small data transmission is requested based on the received first random access preamble on the SDT PRACH resource.

22. The method of claim 17, wherein the PRACH uplink message comprises MSG3 in a 4-step random access procedure, and the contention resolution message comprises a MSG4 in a 4-step random access procedure.

23. The method of claim 17, wherein the PRACH uplink message is included in MSGA in a 2-step random access procedure, and the contention resolution message is included in a MSGB in a 2-step random access procedure.

24. The method of claim 23, wherein the subsequent data transmission of the small data transmission is associated with a data size requiring more protocol data units (PDUs).

25. The method of claim 24, wherein the contention resolution message comprises configuration of configured uplink resources for subsequent transmission of the small data transmission;
wherein the configured uplink resources comprise configured grant (CG) resources for subsequent transmission of the small data transmission or pre-configured uplink resources (PUR) for subsequent transmission of the small data transmission;
wherein the base station receives the subsequent data transmission by receiving a second data payload of the small data transmission in a subsequent PDU on the configured uplink resources in an RRC inactive state;
wherein the contention resolution message is an RRC release message RRCRelease, and the RRC release message RRCRelease responds to the PRACH uplink message and activates an RRC inactive state for a UE sending the PRACH uplink message;
wherein the RRC release message RRCRelease contains a first downlink data payload for the UE.

26. The method of claim 24, wherein the contention resolution message comprises configuration of configured uplink resources for subsequent transmission of the small data transmission;
wherein the configured uplink resources comprise configured grant (CG) resources for subsequent transmission of the small data transmission or pre-configured uplink resources (PUR) for subsequent transmission of the small data transmission;
wherein the base station receives the subsequent data transmission by receiving a second data payload of the small data transmission in a subsequent PDU on the configured uplink resources in an RRC inactive state;
wherein the configuration of configured uplink resources is valid in a period of time.

27. The method of claim 26, wherein the configuration of configured uplink resources includes a parameter to indicate the period of time.

28. The method of claim 24, wherein the contention resolution message comprises configuration of configured uplink resources for subsequent transmission of the small data transmission;
wherein the contention resolution message is an RRC SDT complete message RRCSmallDataComplete which comprises the configuration of the configured uplink resources for the subsequent transmission of the small data transmission.

29. The method of claim 17, wherein the configured uplink resources comprises pre-configured uplink resources (PUR) for subsequent transmission of the small data transmission.

30. The method of claim 29, wherein the base station receives the subsequent data transmission by receiving a second data payload of the small data transmission in a subsequent PDU on the configured uplink resources in an RRC connected state.

31. The method of claim 30, wherein the contention resolution message is a radio resource control (RRC) resume message RRCResume, and the RRC resume message RRCResume responds to the PRACH uplink message and activates an RRC connected state for a UE sending the PRACH uplink message.

32. The method of claim 31, wherein the RRC resume message RRCResume contains a first downlink data payload for the UE.

33. The method of claim 29, wherein the base station receives the subsequent data transmission by receiving a second data payload of the small data transmission in a subsequent PDU on the configured uplink resources in an RRC inactive state.

34. The method of claim 33, wherein the contention resolution message is an RRC release message RRCRelease, and the RRC release message RRCRelease responds to the PRACH uplink message and activates an RRC inactive state for a UE sending the PRACH uplink message.

35. A user equipment (UE) comprising:
a processor configured to call and run a computer program stored in a memory, to cause a device in which the processor is installed to execute a method claim 1.

36. A chip, comprising:
a processor, configured to call and run a computer program stored in a memory, to cause a device in which the chip is installed to execute a method claim 1.

37. A non-transitory computer-readable storage medium, in which a computer program is stored, wherein the computer program causes a computer to execute a method claim 1.

38. A base station comprising:
a processor configured to call and run a computer program stored in a memory, to cause a device in which the processor is installed to execute a method of claim 17.

39. A chip, comprising:
a processor configured to call and run a computer program stored in a memory, to cause a device in which the chip is installed to execute a method of claim 17.

40. A non-transitory computer-readable storage medium, in which a computer program is stored, wherein the computer program causes a computer to execute a method of claim 17.

* * * * *